UNITED STATES PATENT OFFICE.

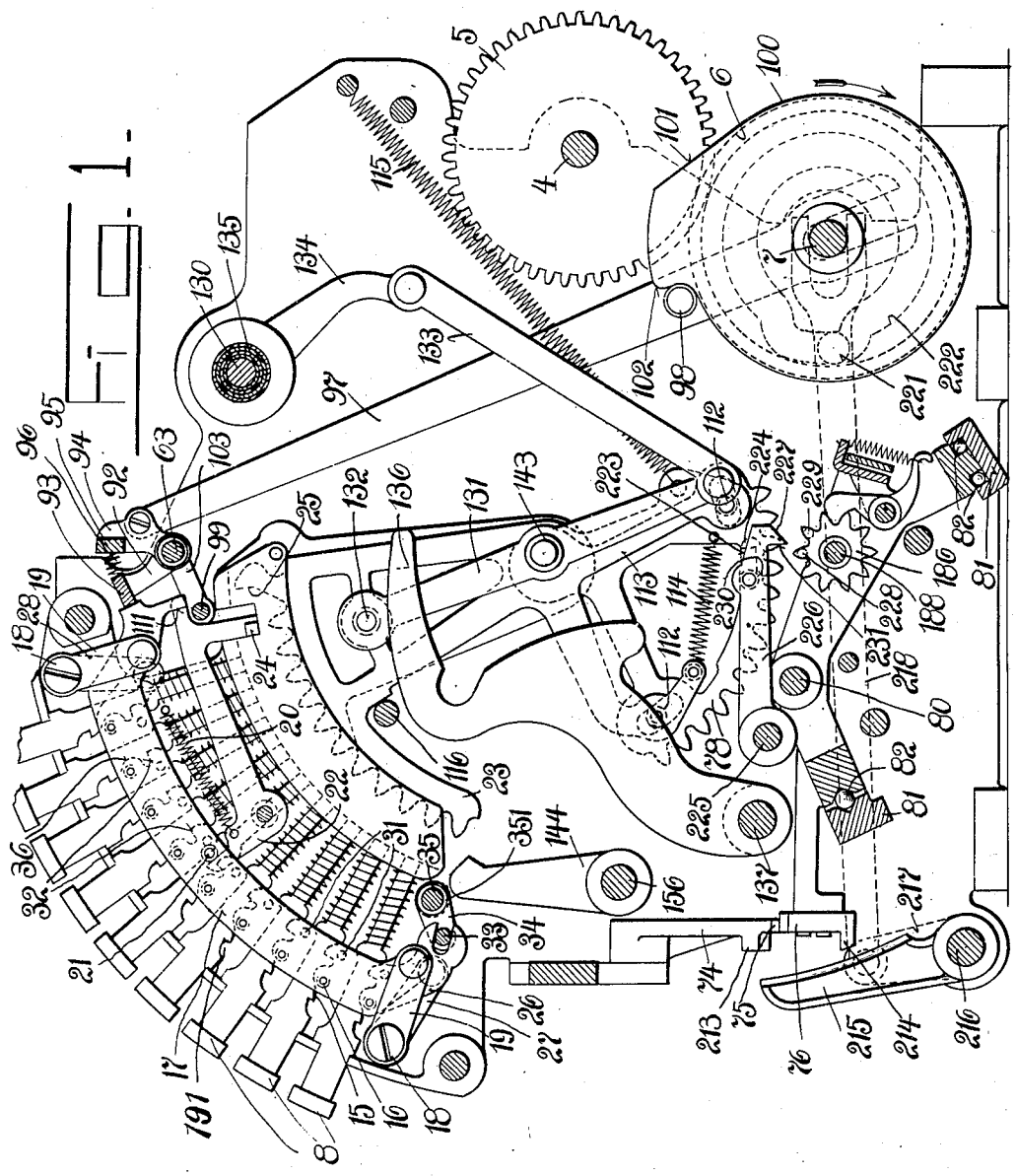

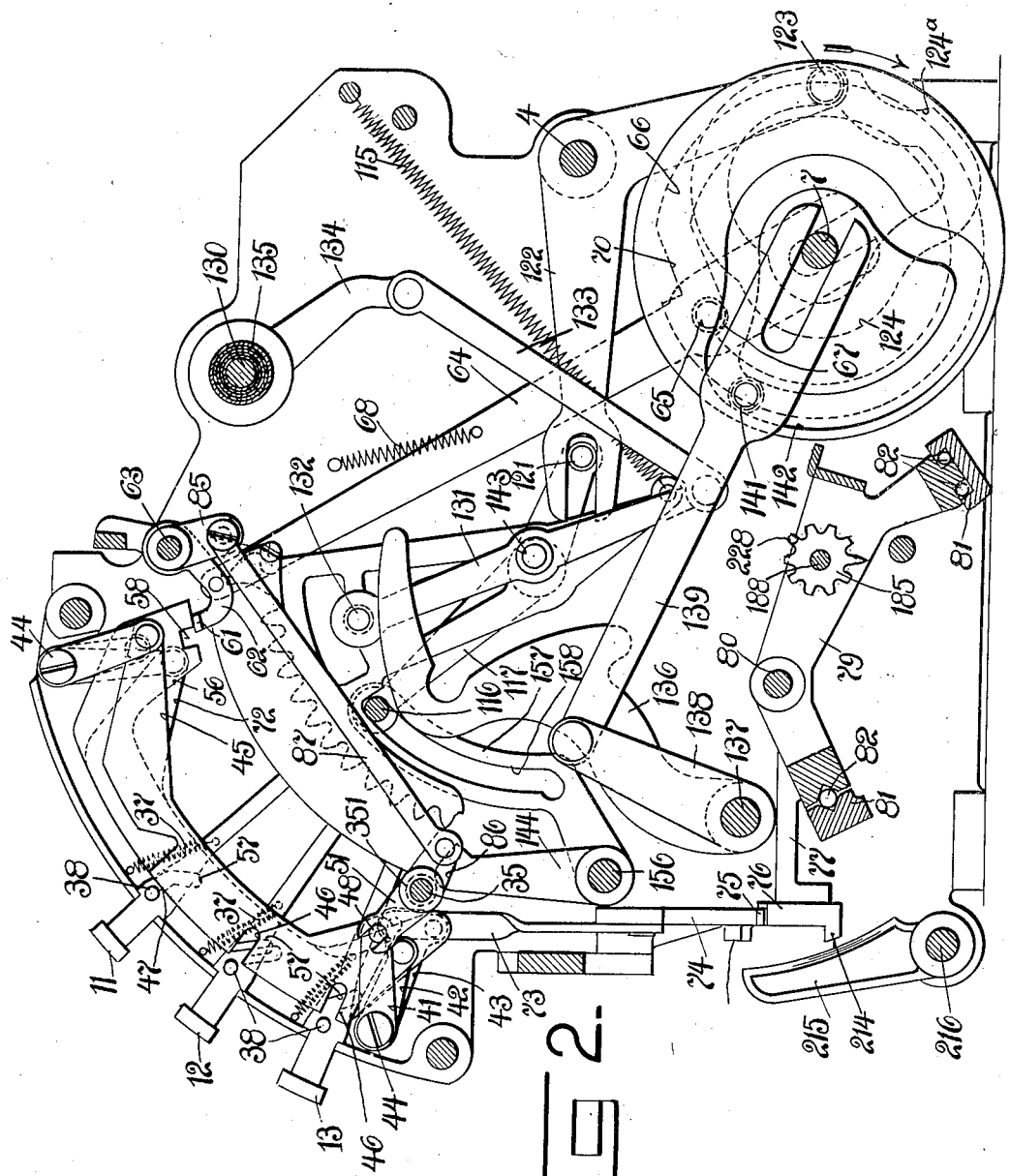

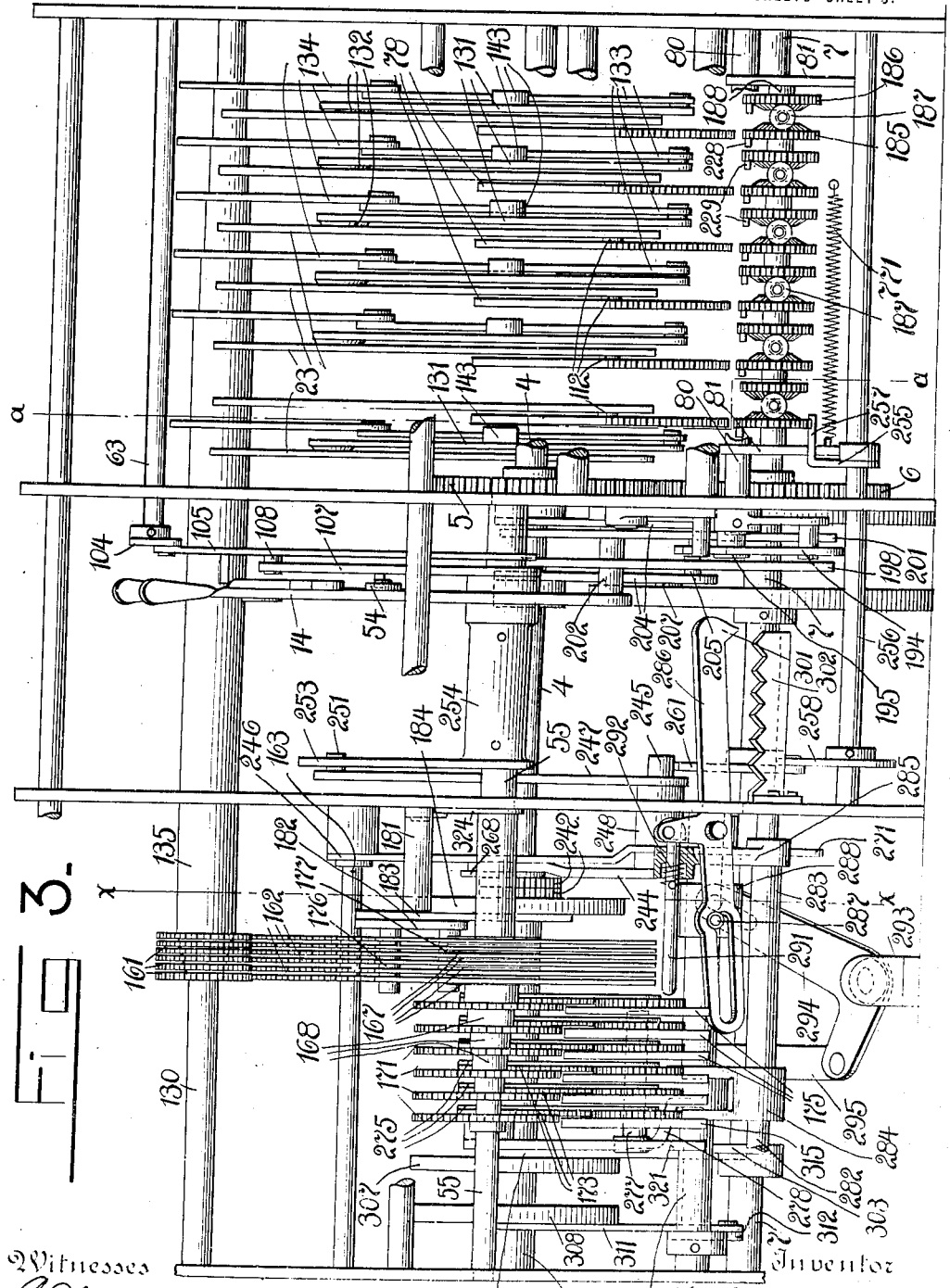

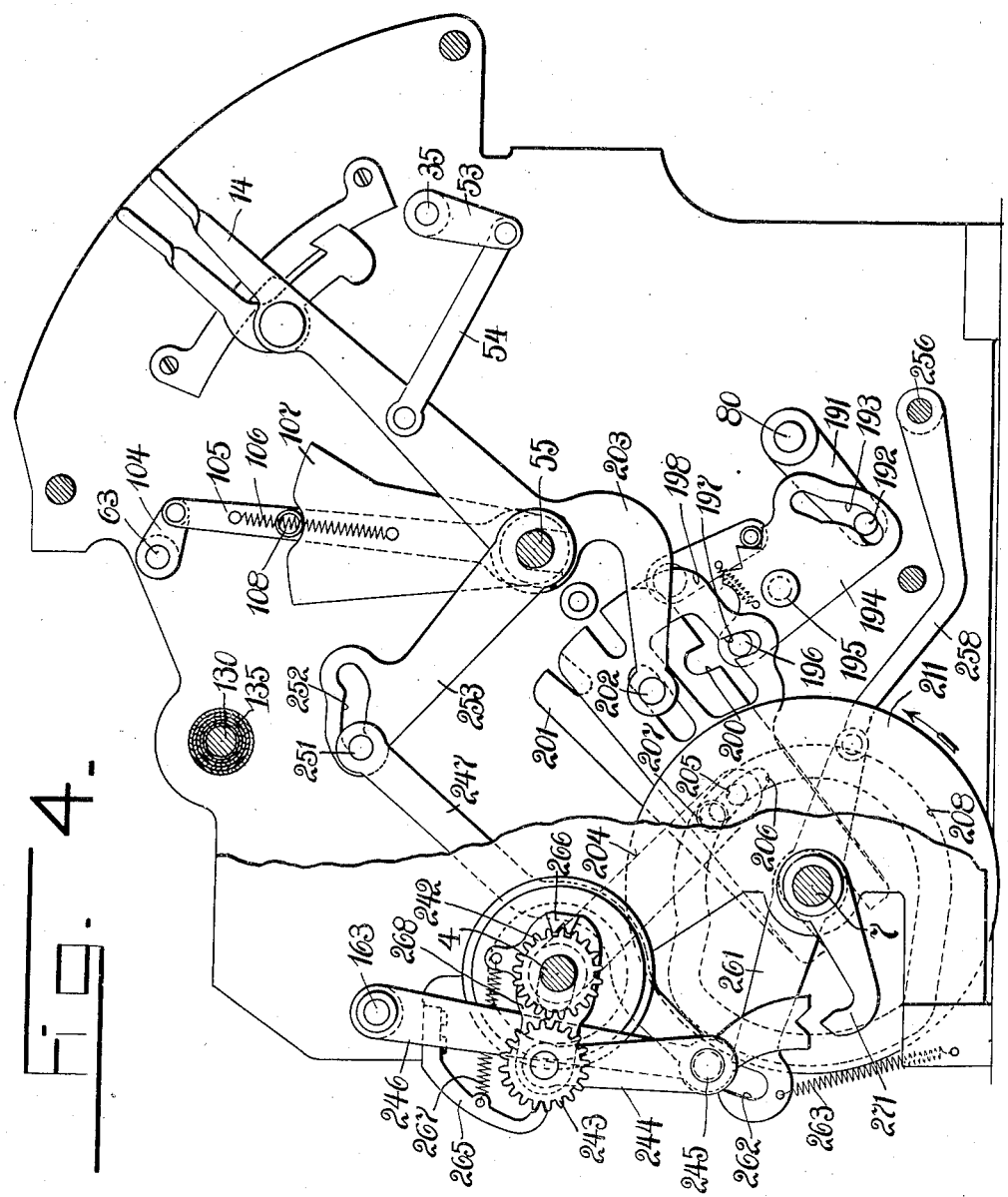

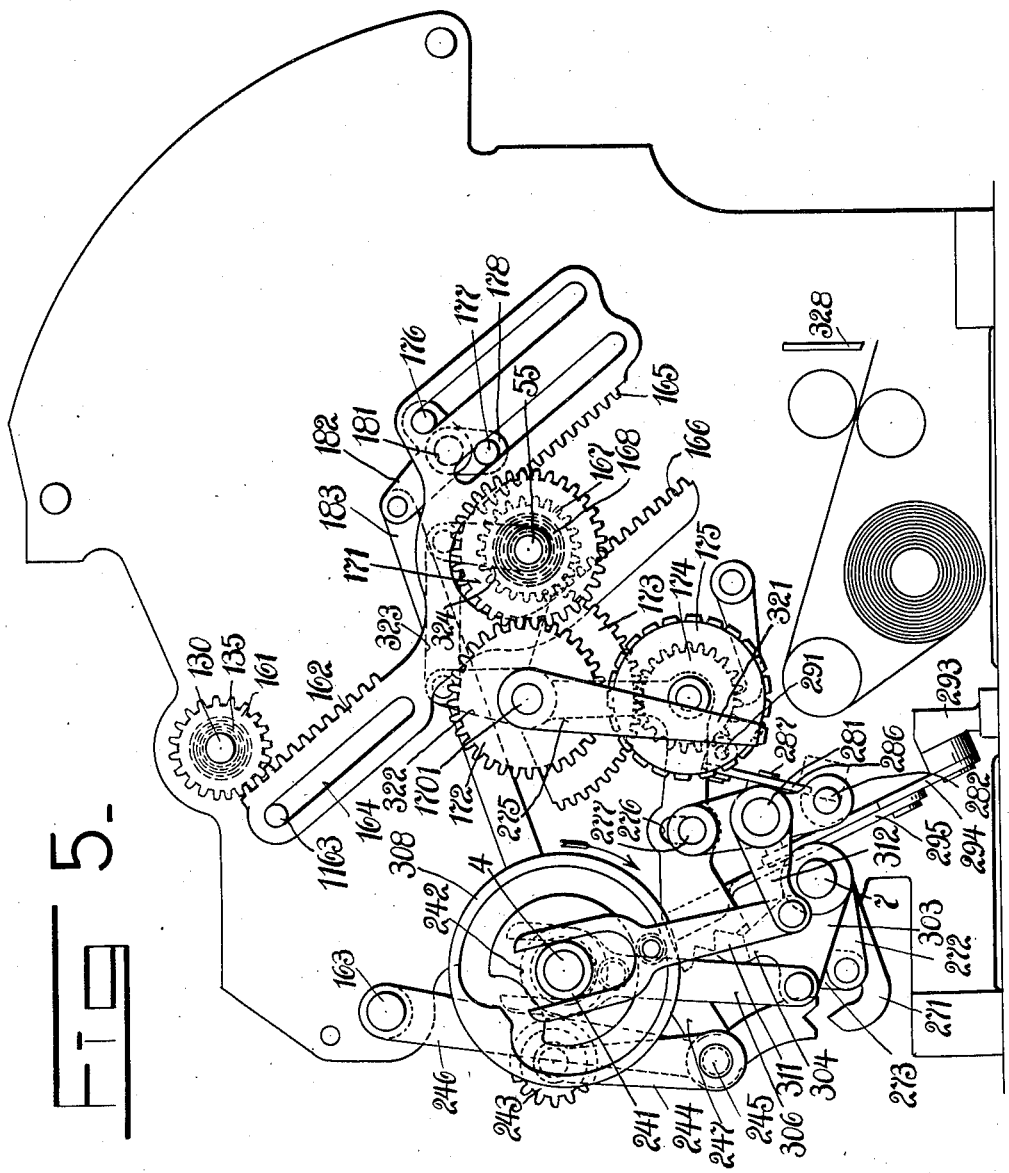

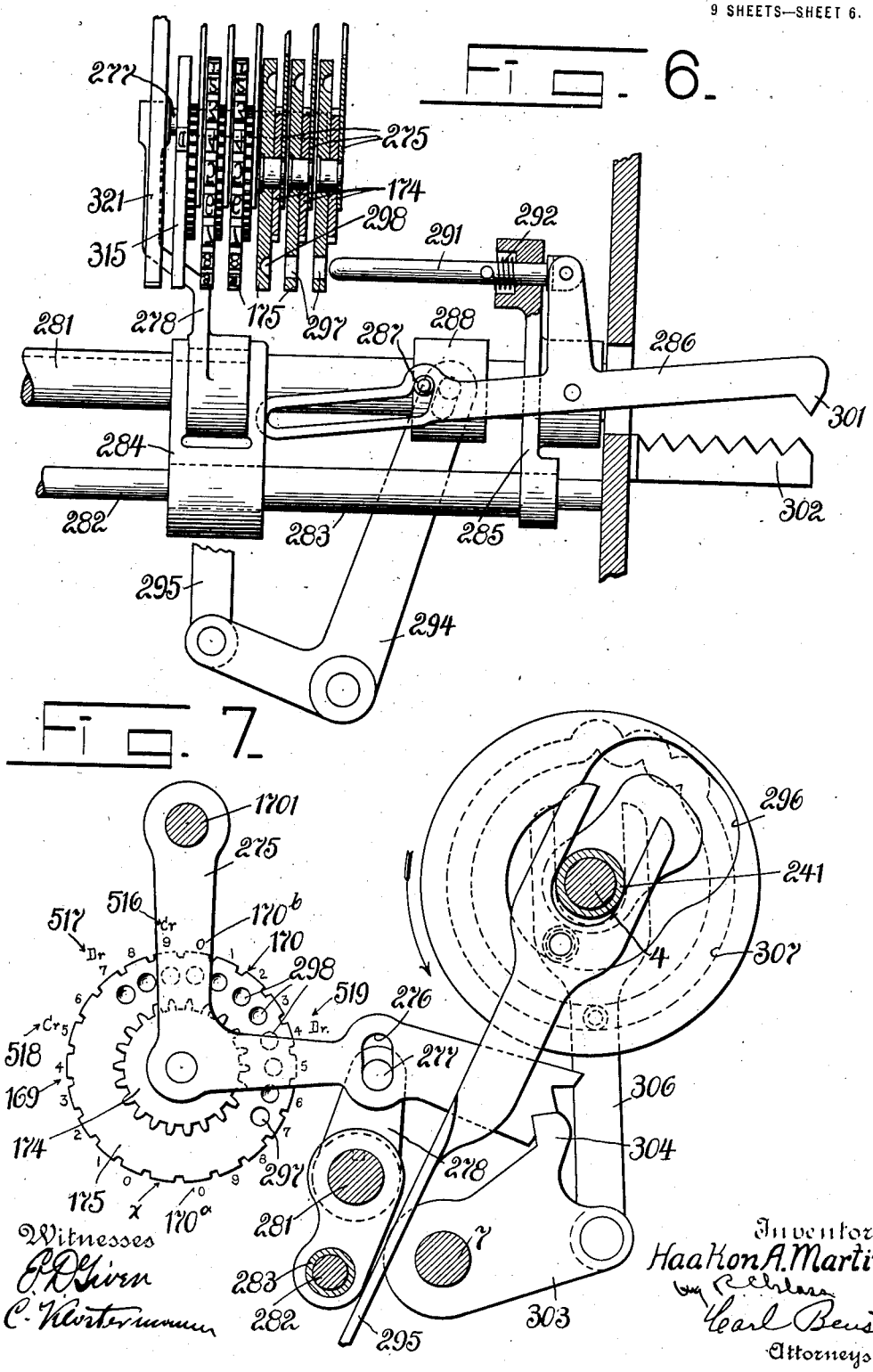

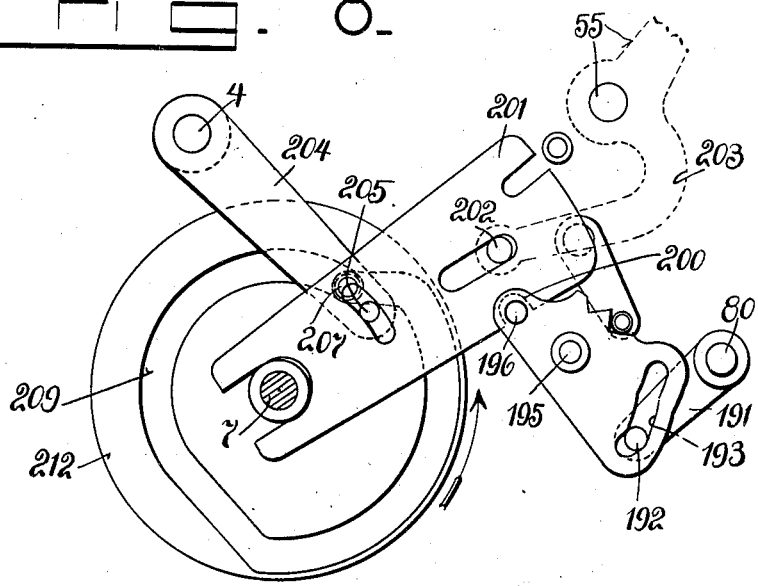
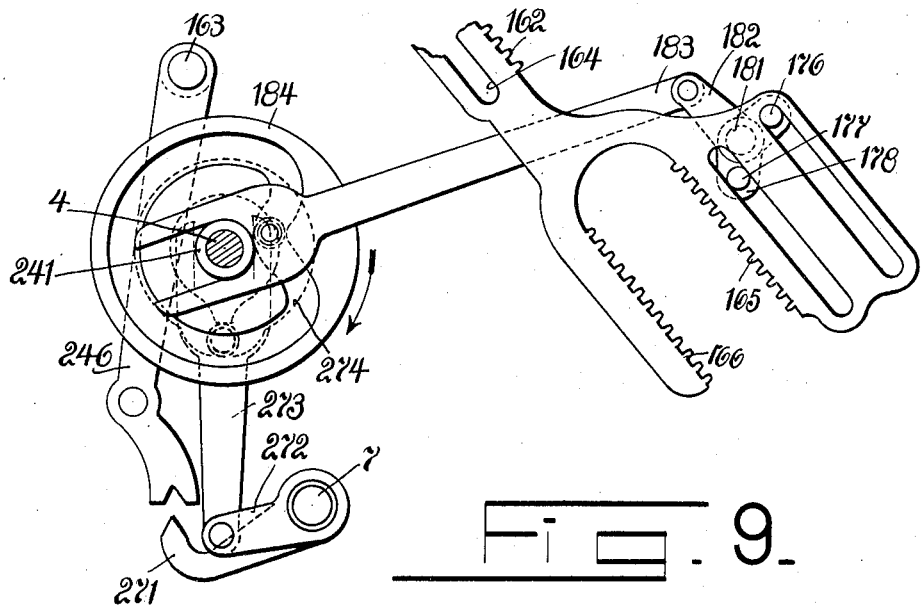

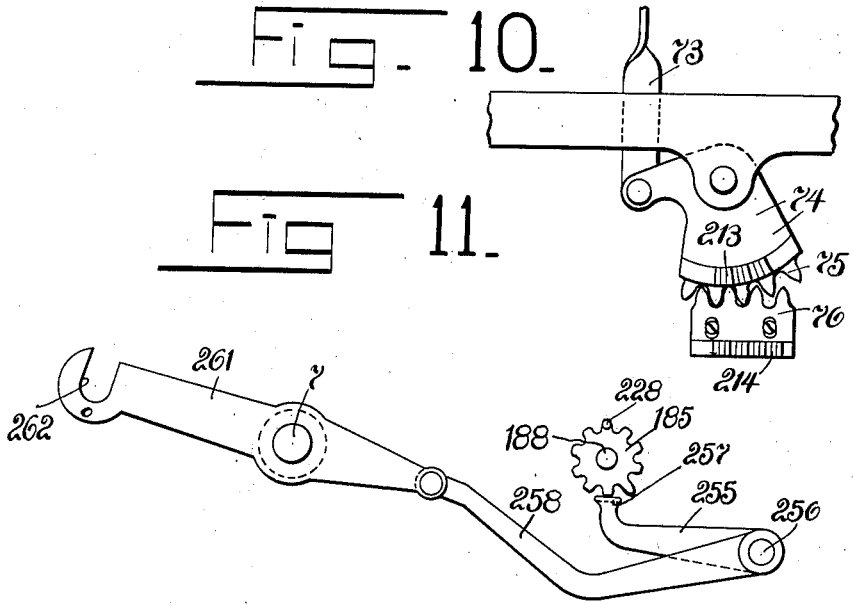

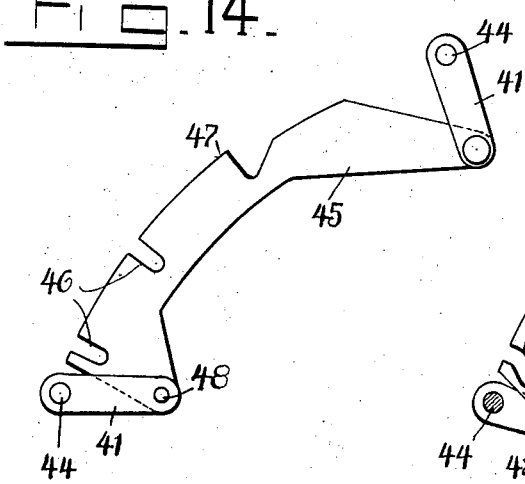
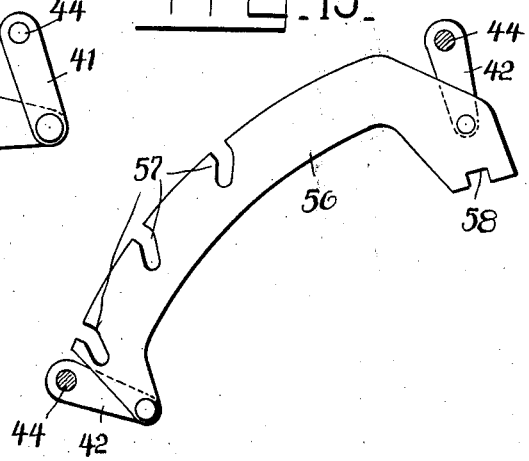
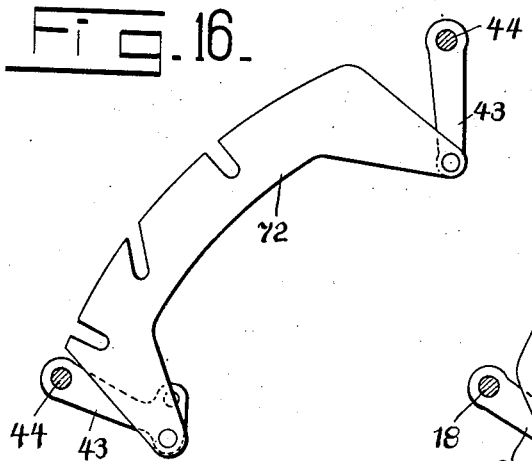
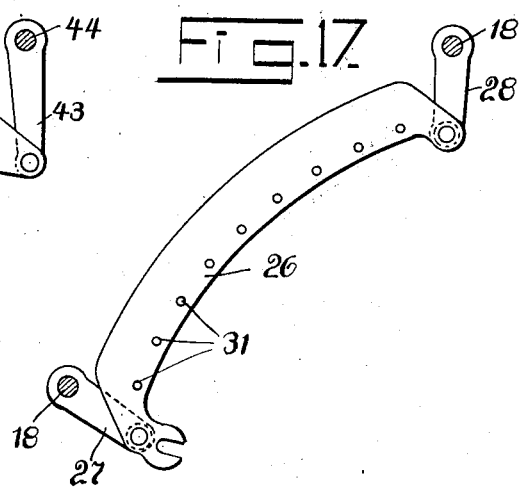

HAAKON A. MARTIN, OF DAYTON, OHIO, ASSIGNOR TO THE NATIONAL CASH REGISTER COMPANY, OF DAYTON, OHIO, A CORPORATION OF OHIO, (INCORPORATED IN 1906.)

REGISTERING-MACHINE.

1,294,507.  Specification of Letters Patent.  Patented Feb. 18, 1919.

Application filed April 15, 1914. Serial No. 831,923.

*To all whom it may concern:*

Be it known that I, HAAKON A. MARTIN, a citizen of the United States, residing at Dayton, in the county of Montgomery and State of Ohio, have invented certain new and useful Improvements in Registering-Machines, of which I declare the following to be a full, clear, and exact description.

This invention relates to improvements in accounting machines of the kind which are arranged to both add and subtract by direct process as distinguished from machines where the subtraction is accomplished by simply adding complements.

The main object of the invention is to provide machines of the general type indicated with an improved total taking mechanism, the most important feature of which is the means for correctly showing the balance or difference between the totals of amounts added and of the amounts subtracted regardless of which of said totals happens to exceed the other. This, of course, involves the showing of what is known as a negative total, or the amount by which a minuend has been exceeded. In machines constructed to subtract by direct process, the operation of the carrying mechanism, which in subtracting serves as the borrowing mechanism, results in a condition which affords the principal obstacle to be overcome before the correct negative total can be shown. In all prior devices of this kind, so far as known to the applicant, the arrangement of the mechanism is such that when a totaling operation is performed under the negative adjustment the right hand figure of the negative total is a unit short and the necessary correction is made by simply adding the unit, either automatically as an incident to the totaling operation or by a separate operation of the machine preliminary to taking the total. Mechanism is, of course, provided for performing the necessary carrying operation when the addition of the unit involves a transfer to higher orders. In applicant's construction, the right hand figure, or in case the amount ends in ciphers, the right hand consecutive ciphers and the first figure to the left of the ciphers, will always be correct; but each of the other or higher digits will be too great by one. The necessary correction is made automatically on the totaling operation by giving each of the digit carriers showing incorrect figures one step of movement to bring to effective position their digits of next lower value.

While the correcting mechanism is shown herein applied to type carriers, it is not the desire to be limited to this one application of the invention. The idea can be applied just as well to many other forms of digit carriers such as totalizer elements and indicators.

Another object of the invention is to provide improved alining devices for movable parts of the mechanism. In the present embodiment this improvement is shown applied to a set of differentially moved totalizer actuators, but it will readily be apparent that the idea is capable of many other applications without departing from the spirit of the invention.

With these and incidental objects in view, the invention consists in certain novel features of construction and combinations of parts, the essential elements of which are set forth in appended claims and a preferred form of embodiment of which is hereinafter described with reference to the drawings which accompany and form part of the specification.

Of the accompanying drawings:

Figure 1 is a transverse vertical section taken at the right side of the highest order amount bank.

Fig. 2 is a section taken at the right of the special key bank on the line *a—a*, Fig. 3.

Fig. 3 is a front elevation of the machine with various parts omitted and others broken away, the object being to show the relative positions of certain features of the mechanism.

Fig. 4 is a section taken on the line *x—x*, Fig. 3, with part of the machine frame broken away better to show the manually adjustable lever and mechanism operated thereby for controlling the totalizer engaging mechanism and the printing devices.

Fig. 5 is a right hand elevation of the printing mechanism with the machine casing and side frame removed.

Fig. 6 is a detail of certain features of the negative total correcting devices.

Fig. 7 is a detail in right elevation of other features of the negative total correcting mechanism, and also shows in diagrammatic form the arrangement of the type.

Fig. 8 is a detail in right elevation of one of the totalizer engaging mechanisms showing particularly the pitman which is employed in totaling operations.

Fig. 9 is a detail of mechanism for reversing the direction of rotation of the type carriers.

Fig. 10 is a detail of part of the mechanism for shifting the totalizer frame.

Fig. 11 is a detail of part of the mechanism by which the highest order adding gear of the totalizer controls the printing of negative totals.

Figs. 12 and 13 show the manner in which debits and credits are listed on the record strip and the way in which debit or credit balances are shown.

Figs. 14, 15 and 16 are detail views of the plates coöperating with the special keys.

Fig. 17 is a detail view of the locking plate for one of the banks of amount keys.

The machine shown in the drawings is adapted particularly for use in banks or similar places where a number of debits and credits are made to the same account. It has a debit and a credit key and prints characters to represent those keys. However, the invention is capable of general application to machines that both add and subtract and, for the sake of clearness and simplicity, the words adding and subtracting are usually used hereinafter in describing parts or operations instead of the corresponding words credit and debit. No indicators or main toltalizer are shown and the department totalizers have been altered to produce an adding and subtracting totalizer, but in all other respects the machine is substantially the same as the one fully shown and described in an application for United States Letters Patent, filed May 9, 1912, by H. A. Martin, Serial No. 696,103 (now Patent No. 1,181,238, dated May 2, 1916). Only the devices directly involved in the present invention are described herein, however, and reference should be made to the application cited if, for any reason, a more detailed description is desired.

The illustrative machine comprises a driving mechanism, differential mechanism, an adding and subtracting totalizer which, under certain conditions, controls the printing mechanism, and a keyboard comprising value keys, special keys, and a manually adjustable lever. The value keys control the differential mechanism, and thereby the operation of the adding and subtracting totalizer as well as the setting of the amount type carriers. The special keys control the lock for the driving mechanism, the positioning of the totalizer frame and the differential operation of the special type carrier, while the manually adjustable lever controls the resetting of the totalizer, and, in connection with said totalizer, the printing of the different totals or balances which may be desired.

The adding and subtracting totalizer is mounted in a sliding frame and comprises a plurality of denominational elements, each element consisting of a pair of gears with an intermediate pinion between them, so that when one of the gears is rotated in one direction opposite rotation of its companion gear will be effected. One of these gears is for addition and the other for subtraction. The totalizer frame normally rests in position to bring the credit or adding gears into coöperative relation to the actuating segments and means operated from the special key bank are provided for shifting the totalizer frame to bring the debit or subtracting gears in coöperative relation to the actuating segments on subtracting operations. If it is desired to subtract an amount which is set upon the keyboard, it is only necessary to depress the debit or subtracting key to effect the positioning of the totalizer frame. At the end of the subtracting operation, a spring restores said frame to the normal position. On credit or adding operations the credit key is operated, but the totalizer frame is not moved, the adding pinions being, as before stated normally in alinement with the actuating mechanism; in fact, about the only reason for providing a credit key is that the machine lock is controlled by the special key bank, and it is necessary to depress a key in that bank before the machine can be operated.

Oscillating segments are used to operate the totalizer. The segments are held in their normal positions by a rod extending across the machine under all of the segments. This rod is lowered at the beginning of an operation to allow the segments for the banks in which keys have been depressed to be drawn away from their home positions by springs provided for the purpose until the segments are stopped by the depressed keys. The rod mentioned is then restored to its original position, and carries the actuating segments back to normal. On adding and subtracting operations the totalizer is engaged with the actuators during this return to normal position and this operation of the differential mechanism is the same regardless of whether the item is being added or subtracted. The effect that the actuating mechanism has on the totalizer, that is whether it is operated to add or subtract, depends entirely upon whether the adding or subtracting gears are at the time in engagement with the actuators. The totalizer is reset in the usual way by changing the time of engaging the totalizer with the oscillating actuators. On a resetting or total taking operation, the totalizer is engaged with the actuators during the movement of the latter away from their normal position instead of, as in adding and subtracting operations, during the return to normal movement of the actuators. These resetting operations are always performed with the adding pinions of the totalizer in engagement with the actuators, and either the amount which is at the time on said pinions or the complement of the amount, depending upon whether the balance is positive or negative is set up on the amount printing type carriers through the differential mechanism.

The printing mechanism comprises a type carrying arm operated by the manually adjustable lever, a special character type carrier controlled by the special keys and a plurality of amount printing type carriers each having two sets of type bearing a complemental relation one to the other. On ordinary adding and subtracting operations, and in printing the balance or difference where the minuend exceeds the subtrahend, that is, where the balance is positive, the amount is set up on one set of type carriers by the differential mechanism under the control of the value keys when listing items or under the control of the totalizer when taking the credit balance. In case the balance to be taken is a negative one, that is, when the subtrahend exceeds the minuend, the action of the devices for rotating the type carriers is reversed by mechanism controlled by the highest order adding gear, thereby causing to be set up on the other set of type the complement of the amount which was on the adding pinions at the beginning of the total taking operation. This complement is then corrected to show the actual negative total by devices controlled by the positions of the type carriers, whereby the right hand type carrier, or, in case the amount ends in ciphers the right hand type carriers showing consecutive ciphers and the first type carrier to the left thereof are held rigidly in position, while the others are given an additional step of movement to subtract one from each of the figures shown thereon.

Each totalizer gear of the adding and subtracting totalizer carries means for tripping transfer devices to carry to the denominational elements of next higher order. Owing to the fact that the adding and subtracting pinions are driven by the same actuators only the one set of transferring devices need be provided. A carrying movement imparted to the adding pinions by the transfer devices causes opposite rotation of the subtracting pinions to the same extent and vice versa. These transfer devices act not only as carrying devices between the denominational groups on adding operations, but serve as the borrowing devices on subtracting operations. The arrangement of the tripping means for the transfer mechanism is such that a negative balance of even one cent will cause operation of the carrying mechanism all the way across the totalizer to position the highest order adding pinion to control the printing of the negative total.

The machine may be driven either by an electric motor or by the usual handle and gearing, although neither are shown in the drawings. The shaft 4 is given one complete rotation in every operation, and, through the gears 5 and 6, (Figs. 1 and 3) imparts a like extent of rotation to the shaft 7. All of the mechanism is driven from these two shafts.

The keyboard in this particular machine comprises five banks of value keys 8, Fig. 1, a bank containing the total key 11, debit key 12 and credit key 13, Fig. 2, and a lever 14, Fig. 4, which is manually adjustable to either of two positions depending upon whether an item is to be entered in the totalizer under the control of the keys of the keyboard or whether a balance is to be printed.

The value keys 8, Fig. 1, control the differential mechanism for the bank, and these keys are depressible in the usual way against the tension of springs surrounding the shanks of the keys. Each key has an inclined edge 15, which, as the key is depressed, engages one of the pins 16 in the key detent plate 17 which is swung from the pivots 18 on links 19. The detent plate 17 for each bank also carries a pin 21 to engage the forward shoulders on bell crank zero stops 22 for the differential segments 23. The zero stops are pivoted on studs carried by the adjacent key bank frame, and are held in the position shown by springs 20 attached at one end to the upper arm of the stop and at the other to a pin in the key frame. When a value key is depressed its inclined edge 15 engages the corresponding pin 16, thus swinging the plate 17 down against the tension of the spring 20 until the notch 19' in the key is brought opposite said pin, when the spring 20 returns the plate far enough toward its normal position to engage the pin 16 with the notch 19' and retain the key in its depressed position. The zero stops 22 have lugs 24 normally in the path of shoulders 25 carried by the differential segments 23. When a value key 8 is depressed and locked in the depressed position as just described, the rear end of the zero stop 22 is raised so that the lug 24 is out of the path of the shoulder 25 on the segment. This permits the segment to operate without any interference on the part of the zero stop when the driving mechanism is actuated.

To lock the value keys against manipulation at the proper time detent plates 26 Figs. 1 and 17 are provided for each value key bank, said plates being on the opposite side of the keys from the plates 17. These plates are also swung from the pivot 18 by links 27 and 28 similar to the links 19 supporting the plate 17. Each plate 26 is provided with pins 31 opposite the notches 32 in the keys. At its lower end the plate 26 has an extension, which is slotted to engage a rod 33 extending beneath all of the value key banks, and supported at either end by arms 34 secured to a sleeve 351 on the shaft 35. This sleeve is rocked by operation of the special keys, and acting through the arms 34 and rod 33 will raise the detent plates 26 to carry their pins 31 into engagement with the notches 32 of the keys which have not been depressed and with the notches 36 of depressed keys, thereby preventing movement of any of the value keys after a special key has been depressed.

The special keys 11, 12 and 13, Fig. 2, are depressible against the tension of springs 37 secured at one end to the shank of the key, and at the other end to the key frame. Each key is provided with a pin 38 to coöperate with three plates (Figs. 2, 14, 15 and 16) which are swung by pairs of links 41, 42 and 43 on the pivot pins 44 in the frame. The first of these plates, plate 45, has slots 46 normally opposite the debit and credit keys 12 and 13, and a shoulder 47 normally in the path of the total key 11. In this normal position of the plate either the key 12 or 13 can be depressed, but operation of the total key 11 is prevented. The pin 48 forming the pivotal connection between the lower end of the plate 45 and the link 41 protrudes far enough to form a stud which is engaged by a slot in the end of arm 51 attached to the shaft 35 which extends across the machine proper, and has secured to its left hand end an arm 53, Fig. 4. This arm 53 is connected by a link 54 to the manually adjustable lever 14. When this lever is shifted to its upper position as a preliminary to a total taking operation, the link 54 and arm 53 rock the shaft 35 far enough to carry the slots 46 therein from under the pins 38 in the debit and credit keys 12 and 13, and, of course, the shoulder 47 is carried out of the path of the pin 38 and the total key 11. Through this mechanism it will be seen that depression of the keys 12 and 13 is prevented and the total key rendered operable when the lever 14 is adjusted to its total taking position. The second of the swinging plates adjacent to the special key bank, plate 56, is the one which controls the operation of the driving mechanism. It has a slot 57 opposite each key pin 38, each of the three slots being alike and operating the plate 56 in the same manner and to the same extent; that is, when any one of the keys is depressed the plate 56 is swung upward to bring a notch 58 in its upper end opposite a laterally extending lug 61 on an arm 62 which is loose upon the rod 63. Pivoted to the arm 62 is one end of a pitman 64 which is forked at its lower end to straddle the shaft 7. This pitman carries an anti-friction roll 65 extending into the race 66 of a cam attached to the rotary shaft 7. In the normal position of the parts, as shown, the roll 65 rests against a shoulder 67 forming a part of the cam groove, holding said cam and the shaft 7 against rotation and thereby preventing operation of the driving mechanism. A spring 68 extending between the pitman 64 and the adjacent machine frame is at all times under tension and tends to raise the pitman. When the plate 56 is swung up to bring its notch 58 opposite the lug 61, the spring 68 will draw the pitman 64 upward and seat the lug 61 in the notch 58, thereby, because of the shape of the slots 57, locking the operated key in its depressed position. This movement of the pitman 64 also raises the roller 65 out of engagement with the shoulder of the cam groove and frees the operating mechanism. At the end of an operation the portion 70 of the cam groove draws the pitman 64 down and withdraws the lug 61 from the notch 38. Just before the portion 70 of the cam groove is carried out of engagement with the roller 65 on the pitman a spring (not shown) draws the plate 56 down to bring its end over the lug 61 so that the arm 62 is held stationary when the cam bearing the groove 66 reaches normal position with the radial portion of the groove opposite the roller 65. The third plate, or plate 72, has no function except to shift the sliding totalizer frame when the debit or subtracting key is depressed. For this reason its slots under the pins 38 in the total and credit keys 11 and 13 are so arranged that the keys can enter when the keys are depressed without causing any movement of the plate. The slot under the pin in the debit key 12, however, is oblique so that as said key is depressed the plate 72 will be raised and this movement of the plate is utilized to bring the debit or subtracting pinion of the totalizer in position to engage the actuator. This shifting movement is accomplished by a link 73, pivoted to the lower end of the plate 72, and having a pivotal connection with a segment 74, Figs. 3 and 10. This segment is pivoted to one of the cross bars of the machine, and has the general form of a bell crank. Its teeth 75 are at all times in engagement with a rack 76 secured to an arm 77, rigid with the totalizer frame 79. Said totalizer frame 79 is slidably mounted on the shaft 80 and in a rock frame 81, the frame 79 and rock frame 81 being grooved to accommodate ball bearings 82 provided to make the sliding movement of the totalizer frame 79 as easy as possible. When the debit key 12 is depressed and the plate 72 raised as just described, the link 73 and bell crank 74 will shift the totalizer frame to the left, Fig. 3, against the tension of a spring 771 connecting the totalizer frame to the machine frame proper, so as to bring the right hand or subtracting gears of each denominational group of the totalizer opposite the actuators 78. The detent plate 56, as stated above, locks the debit key in depressed position and holds it in that position until near the end of the operation, thereby holding the totalizer frame in its adjusted position until the entry in the totalizer is completed. When the key is released the spring 771 returns the totalizer frame to the normal position in which it is shown in Fig. 3, that is, with the left hand or adding gear of each denominational pair opposite the actuators 78.

At stated above, the sleeve 351, Fig. 1, is rocked by operation of the special key, thereby raising the arms 34 and rod 33 to lift the locking detent 26 and engage the pins 31 with the notches in the keys. This rocking movement of the sleeve occurs at the instant that the special keys are locked in depressed position. Rigid with the arm 62 Fig. 2 is an arm 85, and attached to the sleeve 351 is an arm 86. A link 87 connects these two arms. When the arm 62 is rocked by the spring 68 to engage the lug 61 with the notch 58 in the special key locking detent, the link 87 is of course given a downward thrust, and through the arms 86 rocks the sleeve 351. As a result, the arms 34 and rod 33 are swung upward to operate the locking plates 26 and thereby prevent any manipulation of the value keys after a special key has been operated. When the special keys are released as hereinbefore described, the action of these parts is reversed, and the arms 34 and rods 33 will return the locking plates 26 to their normal ineffective positions.

The detent plate 17 is depressed slightly at the end of the operation to withdraw its pin 16 from the notch 191 in the depressed key. This, in connection with the restoring of the detent plate 26 when the special key is released, allows the key spring to return the key to its normal or undepressed position. The plates 17 are depressed as follows: Loosely mounted on the shaft 63 is a yoke 92 having its bar 93 extending laterally across the value banks and contacting the upper ends of the plates 17. Pivoted on the shaft 63 is also a frame 94 with a laterally extending bar 95 to coöperate with the bar 93 of the yoke 92. Compression springs 96 are interposed between the bars 93 and 95, as shown. Pivotally attached to the frame 94 is a pitman 97 forked at its lower end to straddle the shaft 7 and carrying an anti-friction roll 98 extending across the edge of a cam disk 100 secured to the driving shaft 7. As the cam disk 100 nears the end of a rotation, the inclined edge 101 of the cam is brought into contact with the roll 98, raising the pitman 97 and rocking the frame 94 anti-clockwise, Fig. 1. This compresses the springs 96, and, through the yoke 92, forces the detent plates 17 down against the tension of the zero stop springs 20 far enough to disengage the pin 16 from the notch 191 of any key that has been depressed. The plates 17 are held down until the roll 98 drops off of the point 102 of the cam, when the pitman 97 and frame 94 are restored by the springs 96 and the springs 20 return the zero stop 22 and the plates 17 to their normal positions.

When the manually adjustable lever 14 is moved from the item entering position in which it is shown in Fig. 4, to the upper or total taking position, the value keys are automatically locked against depression, and at the same time the zero stops 22 are lifted to withdraw the lugs 24 from the path of the shoulders 25 on the segments 23. Secured to the shaft 63 is a pair of arms 103 carrying a rod 99 extending across all of the banks of value keys, and fastened to the left end of the shaft is an arm 104, Fig. 4, to which is pivoted one end of a pitman 105 slotted at its lower end to engage the stud 55 on which the lever 14 is pivoted. The pitman 105 is drawn downwardly by a spring 106, which is always under tension. Rigid with the lever 14 is a plate 107 with a recess in its upper edge and an anti-friction roll 108 attached to the side of the pitman 105 rests in this recess when the lever 14 is set at its normal item entering position, but when the lever is moved to the total taking position, the recess is carried from under the roll 108 and the pitman 105 is moved upwardly, rocking the shaft 63. This rocking movement of the shaft swings the arms 103 clockwise, Fig. 1, and the rod 99 engages the rear end of the zero stops 22 and raises the stops high enough to carry the lugs 24 out of the path of the shoulders 25. At the same time the rod 99 is brought in front of the extensions 111 on the detent plates 17, holding the plates against downward movement, and depression of the value keys is prevented by the inclined edges 15 striking against the pins 16. After the total taking operation, the lever 14 is moved back to the item entering position, and the spring 106 restores all of the parts just mentioned to the normal positions in which they are shown in the drawing.

The differential mechanism comprises an oscillating segment 23 (Figs. 1 and 2) for each bank, said segment being pivoted on studs in the adjacent machine frame. The value or amount banks each have pivoted on the same studs an actuating segment 78 having slot and pin connections 112 with downwardly extending arms 113 of the segments 23, these slot and pin connections being provided so as to permit a slight movement of the segment 78 independent of the segment 23. This independent movement is given to segment 78 by springs 114 in carrying from totalizer elements of lower to elements of higher value. The operation of this carrying mechanism is fully shown and described in the application above cited. Attached to the rear arm 113 of the segment 23 is a spring 115 which is fastened at its other end to the machine frame. This spring is at all times tensioned to rock the segments 23 and 78 anti-clockwise, but this is normally prevented by a rod 116 which passes across the machine under all of the segments 23 and is carried by arms 117 pivoted on the stud carrying the segment 22 for the units and special key banks. Rigid with each of the arms 117 is an arm carrying an anti-friction roll 121 extending into the slot of a bell crank 122 pivoted on the shaft 4. The downwardly extending arms of the bell cranks carry rolls 123 extending into the grooves of cam disks fastened on the shaft 7. The cam grooves are so shaped that shortly after the shaft 7 begins to rotate the bell cranks 122 are swung anti-clockwise, Fig. 2, lowering the rod 116 and the springs 115 will then swing the segments 23 and 78 about their pivots. The zero stops 22 will, if no keys have been depressed, limit the movement of the segments to a single step, but in the banks where keys have been depressed the zero stops will have been lifted to carry their lugs 24 out of the path of the shoulders 25, and the segments in such banks will continue their movement until the shoulders 25 strike the inwardly projecting ends of the depressed keys. The segments remain in these adjusted positions while the rolls 123 are in the concentric portions 124 of the cam grooves, during which time the type carriers are set and the totalizer rocked into engagement with the segments 78. The cam grooves then rock the bell cranks 122 back to normal, restoring the rod 116 to its original position and thereby carrying the segments 23 and 78 back to their starting points and actuating the totalizer. The totalizer is disengaged from the actuators 78 when the actuators reach the points where they would have been arrested by the zero stops 22 if no keys had been depressed and the remaining step of movement to the normal position does not affect the totalizer.

To insure correct alinement of the segments 23 when in their differentially adjusted positions so that the totalizer may be properly engaged with the segments 78, alining arms 144 (Fig. 2) are provided, said arms being secured to the shaft 156. Also fastened to the shaft 156 is a curved arm 157 with a slot 158 concentric to the stud on which the arms 117 are pivoted. The rod 116 carried by these arms passes through the slot mentioned. The slot 158 is slightly shorter than the arc through which the rod 116 is swung and near the end of the downward movement of the rod it strikes the bottom of the slot 158, forcing the lever 157 down and rocking the alining arms 144 into engagement with the alining teeth of the segments 23 and holding them in engagement until the rod 116 starts to return to its normal position. This locks the segments 23 firmly in their adjusted positions and while they are so locked the type carriers are adjusted and the totalizer is engaged with the teeth of the actuating segments 78. As shown, the slot 158 is cut out slightly at the bottom to permit operation of the arms 157 as indicated. This construction provides a very effective positive alining device particularly adapted to use in cases where the parts alined must be firmly held while other parts are being adjusted to positions dependent upon the positions in which the first mentioned parts are locked.

The differential positioning of the segments 23 only predetermines the positions of the type carriers, and the carriers are then adjusted by devices comprising a beam 131 for each bank pivoted to the segments 23 as at 132. The other end of the beam is pivoted to a link 133 which is, in turn, pivoted to an arm 134 rigidly attached to shaft 130 or to one of the sleeves 135. For each beam 131 there is provided a cam arm 136. All of these arms are fastened to the shaft 137, as is also an arm 138, Fig. 2. A pitman 139 carrying a roll 141 extending into the groove 142 of a cam secured to the shaft 7 is pivoted to the upper end of the arm 138 and after the segments 23 are positioned to represent the values registered, the pitman 139 is operated by its cam to rock the shaft 137 and swing the cam arms 136 rearwardly to engage the V-shaped openings in the arms with anti-friction rollers 143 attached to the sides of the beams 131. This swings the beams about their pivots 132, and, through the links 133 and arms 134, causes differential rotation of the shafts 130 and sleeves 135 to extents corresponding to the positions at which the segments have been stopped by the depressed keys. The differential rotation of the shaft and sleeves is, as will appear later, accomplished in exactly the same way when the totalizer is reset to zero, and occurs at the same point in the operation of the machine. In either case the differential movement of the shaft and sleeves is transmitted through the intermediate devices to the type carriers. The cam arms 136 remain in engagement with the rolls on the beams 131 while the rod 116 restores the segments 23 to normal, so the type carriers are all returned to their neutral positions at the end of the operation.

Attached to the left ends of the shaft 130 and sleeves 135 are gears 161, Fig. 5, which gears mesh with the teeth of a rack 162. These racks are held in engagement with the gears by a rod 1163 passing through slots 164 in the racks. All of the racks are forked at their lower or forward ends and the inner edges of the forks are provided with teeth 165 and 166 to engage the teeth of gears 167 secured to nested sleeves 168 supported by the shaft 55 to which the lever 14 is fastened. These sleeves also carry gears 171 meshing with gears 172 rotating about the shaft 1701 and rigid with gear segments 173, which are always in engagement with gears 174 secured to the sides of the type carriers 175. The racks 162 are supported at their forward ends by pins 176 and 177 in the arms of a bell crank 178 pivoted on a stud 181 in the machine frame. Rigid with the bell crank 178 is an arm 182. The pitman 183 normally holds the pins 176 and 177 in the position shown in the drawing thereby supporting the rack 162 in its uppermost position, in which position the lower teeth 166 of the rack are in engagement with gears 167. This is the position of the parts when entering items and when printing positive balances. By tracing the movement through the various intermediate devices it will be seen that the above mentioned differential rotations of the shaft 130 and sleeves 135 will cause rotation of the type carrier in a clockwise direction, as shown in Fig. 5.

The type carriers for the amount banks have a neutral position marked X in the drawing, and each carrier has two sets 169 and 170 of type, the sets bearing a complemental relation one to the other as shown in Fig. 7. For reasons appearing later, the negative type on each carrier have two zeros 170$^a$ and 170$^b$. The normal rotation of the type carriers in a clockwise direction, Fig. 5, will therefore set up on the forward or positive type 169, the values represented by the amount keys depressed. In case no key is depressed in a bank, the idle step of movement taken by the segments 23 before their shoulders 25 engage with the lugs on the zero stops will result in the corresponding type carriers being moved simply from the neutral position X to position the positive zero at the printing line. In printing negative balances the pitman 183 is forced upward by its cam 184, Fig. 9, rocking the bell crank 178 about its pivot and lowering the forward ends of the racks 162 to engage the teeth 165 with the gears 167. Differential rotation of the shaft 130 and the sleeves 135 will then cause anti-clockwise rotation of the type carriers to set up the amount on the rear or negative type 170. The manner in which this pitman is controlled will be fully explained hereinafter.

The totalizer is, as before indicated, carried in two frames, a sliding frame carrying the totalizer proper, and a rock frame in which the sliding frame is mounted. The totalizer as shown in Fig. 3 comprises six pairs of gears 185 and 186 rotatably mounted on a shaft 188. Only five of these sets are actuated by operations of the machine, the sixth set being operated only by operations of the transfer devices. Pinions 187 are rotatably mounted on pins in the shaft 188, and these pinions are at all times in mesh with the gears 185 and 186. By this construction rotation of one of the gears will cause rotation of the companion gear in the opposite direction. The sliding frame is, as before stated, normally held by the spring 771 in position to hold the adding gears 185 in alinement with the actuating segments 78. The manner in which the totalizer is shifted by operation of the subtracting or debit key to bring the subtracting gears 186 in alinement with the actuators 78 has already been explained.

The totalizer rock frame 81 is secured to the shaft 80 on which the sliding frame 79 is loosely mounted. This shaft extends through the machine frames and has secured to its left end an arm 191, Fig. 4. This arm carries a pin 192 projecting through a cam slot 193 in a plate 194 pivoted at 195 to the machine frame. The cam slot 193 is so shaped that if the plate 194 is rocked about its pivot to carry the forward ends downward the arm 191, the shaft 80, and the totalizer rock frame 81 are rocked to engage the totalizer gears with the actuators 78. This rocking movement is accomplished in the following manner: The rear end of the plate 194 carries a pin 196, which is at all times in engagement with either the notch 197 in a pitman 198, or with the notch 200 in a pitman 201. These pitmen are slidably mounted at their lower ends on a shaft 7, and at their upper ends on a pin 202 in an arm 203 forming a part of the lever 14. For each of these pitmen there is provided an arm 204 loosely pivoted on the shaft 4 carrying a pin 205 extending through slots 206 in the pitman and a roll 207 extending into the grooves 208 and 209 of cams 211 and 212 secured to the shaft 7. The slot and pin connection between the pitmen 198 and 201 and the arms 204 is provided to permit adjustment of the pitmen in either direction without changing the position of the rolls 207. The groove in the cam 211 is so arranged that it reciprocates the pitman 198 during the latter part of the operation of the machine, or while the actuating segments 78 are moving back to their normal starting points, while the groove in cam 209 is so arranged that its pitman is given a similar movement during the forepart of the operation, or while the segments 78 are moving from their starting points to their adjusted position. It is clear, therefore, that the time at which the totalizer will be engaged with the actuating segments depends upon whether the pin 196 is in engagement with the pitman 198, or the pitman 201. During item entering operations the lever 14 is always in its lower position and the pitman 198 is then effective to rock the totalizer engaging mechanism to engage the totalizer with the actuators during the up stroke of the actuators, while adjustment of the lever to its upper or total taking position engages the pitman 201 with the pin 196, resulting in engagement of the totalizer during the downstroke of the actuators. The effect of an operation of the machine under the last adjustment is, of course, to reset the totalizer to zero.

It is necessary to aline the sliding totalizer frame 79 so that when it is adjusted to bring the subtracting gears 186 opposite the actuators 78 said gears will be accurately positioned in the same vertical plane with the actuators and maintained in this plane during the rocking movement of the totalizer frame. For this purpose the segment gear 74 and rack 76 are provided with teeth 213 and 214 respectively for engagement by the alining device 215, Figs. 1, 2 and 10. This device is fast on a shaft 216 carrying rigidly an arm 217 pivoted at its upper end to a pitman 218 supported by the driving shaft 7, and having a roller 221 extending into a cam slot 222 fast to the driving shaft. At the beginning of the rotation of the shaft the cam shifts the pitman rearwardly, and thus engages the alining device 215 with the teeth 213 and 214. When the totalizer frame 81 is rocked to engage the totalizer with the actuators, the rack 76 is, of course, carried down out of mesh with the segment 74, but it is retained in the same vertical plane by the alining device 215, Figs. 1, 2 and 10, which is provided with a curved edge for this purpose. The alining device is not again disconnected from the segment 74 and rack 76 until the totalizer has been operated and rocked out of engagement with the actuators. The keys are released and the alining device 215 withdrawn simultaneously after reëngagement of the rack 76 with the segment 74. Then if the frame 79 was shifted because the subtracting or debit key was used in the operation, the spring 771 restores the sliding frame 79 to its normal position.

To accomplish transfers the segments 78 have the slot and pin connection 112 before mentioned allowing the segments 78 a step of movement relative their respective segments 23, so that they may actuate their totalizer elements one step farther than is determined by the differential movement of the segments 23. This step of movement is normally prevented by the arms 223, Fig. 1, striking pins 224 in the segments 78, and holding said segments against the tension of the springs 114 as the segments 23 are restored to normal position. The arms 223 are each secured to one end of a short sleeve loosely mounted on the shaft 225. To the other end of each sleeve and above the totalizer unit of next lower denominational order is secured an arm 226. Each arm has an inclined edge 227 which is engaged at the proper time in item entering operations by the transfer pins 228 and 229 in the adding and subtracting gears 185 and 186 respectively, thereby forcing the arms 226 upward and lifting the forward end of the arms 223 from engagement with the pins 224. This allows the spring 114 to draw the segments 78 forward a distance equal to about one tooth space, this distance being determined by the shoulders 230 on the under sides of the arms 223. Means (not shown) are provided for retaining the arms 223 and 226 in their raised or tripped positions until the transfers are turned in, after which the arms are restored. Just before this restoring operation the totalizer is disengaged from the actuating segments and the portion 124$^a$ of the cam groove 124 for operating the segment restoring rod 116 allows the rod to lower the segments a distance equal to about two tooth spaces just before the rotation of the cam is completed. It is during this time that the transfer devices are restored, and the segments 23 are then returned to normal position causing the pins 224 to engage the ends of the arms 223 and thereby hold the segments 78 in position to again effect a transfer when the arms 226 are forced up by the transfer pins.

When the totalizer is reset in total taking operations, the adding gears 185 are always in engagement with the actuators 78 during the down stroke of the actuators causing rotation of the gears in a direction opposite to that in which they moved during adding operations and the pins 228 in the gears 185 then strike the shoulders 231 on the arms 226 limiting the downward movement of the actuators to extents depending upon the number of steps that the pins 228 have been carried away from their normal position during item entering operations. In case a totalizer element already stands at zero, the idle step of movement of the segment 23, which occurs before the totalizer is engaged with the actuators, will cause subsequent adjustment of the type carriers to position the positive zero or the negative zero 170$^a$ at the printing line, depending upon whether the totalizer is at the time in a positive or a negative condition. After the actuators have been stopped in this way, the cam arms 136 adjust the type carriers, in the same manner as before described, to set up on the carriers the amount which was on the gears 185. This part of the operation is the same regardless of whether the amount so set up is positive or negative.

The pins 228 are so placed in the adding gears that they trip the transfer devices as said gears pass from 9 to 0, while the pins 229 are positioned to trip said devices as the subtracting gears pass from 1 to 0. It is to be understood, of course, that neither set of pins affects the transfer devices except when the gears carrying them are in mesh with the actuators 78; also that the operation of the transfer devices on either set of gears causes opposite rotation of the companion gears to the same extent. When amounts are added only, or when amounts are added and subtracted and the total of the additions exceeds the total of the subtractions, the transfer devices operate simply to carry between the denominational groups in the usual way. If, however, a subtracting item only is entered in the totalizers, or the total of the subtractions exceeds the total of the additions, the first subtracting gear to pass from zero to 1 will trip the transfer to the next higher bank causing rotation of the subtracting gear of that bank one step to operate its transfer mechanism and so on clear across the totalizer to the highest denominational order. If, for example, the totalizer is at zero, either because it has been reset, or because the items added and subtracted are equal, and one cent is entered on the subtracting gears the transfer pins 229 will trip all of the transfers, and the subtracting gears will then all stand at 1. This, of course, causes reverse rotation of the adding gears, and they will all stand at 9. Then if the next entry is an addition the first adding gear to be advanced from 9 to 0 will again operate the transfers all the way across the totalizer and restore the totalizer to a positive condition. For instance if after the one cent subtraction has been made as described, one cent be added, the one step actuation of the cents adding gear will move the gear from 9 to 0 and the subtracting gear from 1 back to 0 and the tripping of the transfers by the transfer pins in the adding gears will restore all of the higher order pairs to zero. The arrangement described of the subtracting transfer pins controls the mechanism for reversing the rotation of the type carriers to correctly set up on the negative type the true total of subtracted items or the true amount by which the total of the amounts added has been exceeded when items have been both added and subtracted.

Reversing the direction of rotation of the type carriers to set up amounts on the negative type is, as before stated, accomplished by movement given the pitman 183 by its cam 184, Fig. 9. It is apparent that this movement should occur only when the balance to be shown is negative, and means are provided for automatically connecting this cam and the driving mechanism proper in negative total taking operations. The cam 184 is attached to a sleeve 241 loosely mounted on the driving shaft 4. The sleeve and shaft each have attached thereto a pinion 242, Fig. 3. A broad tooth pinion 243 is thrown into engagement with the pinion 242 on negative totaling operations, thereby forming a driving connection between the shaft 4 and sleeve 241. The broad tooth pinion is rotatably mounted on a pin in the upper end of an arm 244 secured to a short shaft 245 journaled in the lower end of a link 246 swung from the rod 163. Attached to the other end of the shaft 245 is an arm 247. Spacing collars 248 maintain the parts in correct relative positions on the shaft 245. The upper end of the arm 247 carries a pin 251 extending through a cam slot 252 in the upper end of an arm 253 rigidly connected by its hub 254 to the shaft 55 on which manually adjustable lever 14 is fastened. If the parts just mentioned are in the positions in which they are shown in the drawing, and the lever 14 is adjusted to its upper or total taking position, the cam slot in the arm 253 will carry the arm 247 down and in a backward direction, because of the pull of the spring 267 acting through the plate 268 the link 246 will rock about the shaft 163, thereby preventing the arm 244 from being swung forward to engage the broad tooth pinion 243 with the pinions 242. This is the operation of the parts when the total is positive. In a negative total taking operation when the transfer mechanism is tripped all the way across the totalizer by the pins in the subtracting gears devices are operated by the totalizer for holding the shaft 245 immovable when the lever 14 is adjusted, thereby causing the arms 244 and 247 to operate as a bell crank. To accomplish this the highest order adding gear has all but one of its teeth shortened as best shown in Fig. 11. An arm 255 secured to the shaft 256 has a finger 257 extending laterally under the gear and, as shown in Fig. 3, this finger is long enough to coöperate with the adding gear regardless of whether the totalizer is in the adding or the subtracting position. All of the teeth on the highest order subtracting gear are shortened so that while they are long enough for the actuators 78 to operate them, they cannot engage the finger 257 when the totalizer is operated for subtraction. Fastened to the shaft 256 is also an arm 258 Figs. 2, 4 and 11 loosely connected to a lever 261 pivoted on the driving shaft 7, and having a notch 262 to engage the shaft 245. A spring 263 normally holds the rear end of the lever 261 down and the arm 255 up in position to coöperate with the long tooth of the totalizer adding gear. When the transfer mechanism is tripped all the way across the totalizer, the higher order subtracting gears are all advanced a step in the usual way, and the corresponding adding gears are oppositely rotated to the same extent. This step of movement carries the long tooth of the highest order adding gear over the finger 257 camming the finger down and holding it down as long as the totalizer is in a negative condition. The downward movement of the finger rocks the arm 261 so that its notch 262 will engage the shaft 245, and hold the shaft and its supporting link stationary when the lever 14 is moved to total taking position. The rod 245 and the notch 262 then act as the fulcrum for the bell crank formed by the arms 244 and 247 and adjustment of the lever 14 throws the broad tooth pinion 243 into engagement with the gears 242 against the tension of spring 267. Then when the machine is started the shaft 4 and sleeve 241 rotate as a unit, and the cam 184 at once operates the pitman 183 to lower the racks 162 and thereby reverse the direction of rotation of the type carriers so that the amount set up under the control of the totalizer will be set up on the negative type.

In order to hold the broad toothed pinion 243 and the pinion 242 fast on the sleeve 241 in correct alinement when disengaged an alining arm 265, rigidly attached to the machine frame is provided for the pinion 243 and a plate 268 pivoted to the arm 244 and slidably mounted on the shaft 4 carries teeth 266 to engage the pinion 242 fast on the sleeve 241. A spring 267 connects the plate and the alining arm and normally tends to draw the plate 268 and the gear 243 to the left. The arrangement of these alining devices is such that the two pinions in question are held against rotation, except when the broad toothed pinion is thrown forward into engagement with the pinion 242.

In addition to the notch 262 in the lever 261 holding the link 246 an auxiliary alining device is provided to hold the link during an operation. This is necessary because when the totalizer is reset the long tooth on the highest order adding gear is, of course, immediately carried back to normal position. The arm 255 is then free to be moved by the tension of the spring 263 attached to the arm 261, and the rod 245 could then move toward the rear and allow the broad toothed pinion to be disengaged from the pinions 242. The devices preventing this comprise alining arm 271, Figs. 4, 5 and 9, coöperating with the notch in the lower end of the link. This arm is secured to a sleeve loose on the shaft 7, this sleeve also carrying fast an arm 272. A pitman 273 is pivoted to the arm 272, said pitman being reciprocated in negative total showing operations by a groove 274 in a cam secured to the sleeve 241, which sleeve it will be remembered is only rotated on negative totaling operations. The groove 274 is so shaped that as soon as the sleeve starts to rotate the arm 271 is drawn up into engagement with the notch in the lower end of the link 246 and held in engagement until just at the end of the operation so that there is no danger of the broad toothed pinion becoming disengaged until all of the functions of the machine are performed.

The manner in which the totalizer is reset and the amount on the adding pinion transferred to the type carriers has already been explained. It has also been made clear that when the amount on the adding wheels is positive, it is set up on the positive type, and when negative the rotation of the carriers is reversed and the amount set up on the negative type. In the latter case, however, the amount transferred to the type carriers is not the correct amount by which the total of the amounts added have been exceeded, due to the operation of the transfer devices. Take for instance, in the example mentioned above where the totalizer became negative by one cent, and all of the adding gears were, by the operation of the transfer devices, reversely rotated until they were all at their nine positions. If the totalizer is then reset each of the adding elements will have nine steps of movement back to zero, and the five type carriers are all advanced nine steps in the negative direction so that they will then be positioned to print the complement of the amount on the adding gears or 111.11. This amount, which is the same as is on the subtracting gears, is, of course, wrong and correcting devices are provided which, in this particular instance, will give all of the type carriers except the right hand one a step of movement to show their digits of the next lower order, in this case the zeros 170$^b$. before the impression is taken. Then instead of 111.11 the carriers will print 000.01.

This correcting mechanism will next be described. Each of the type carriers is pivoted to the side of a plate 275 swinging from the shaft 1701. The rearwardly extending arm of each of the plates has a slot 276 through which extends a pin 277 carried by an arm 278 splined on a shaft 281 journaled in the machine frame. Slidably mounted on a rod 282 is a sleeve 283 carrying rigidly mounted thereon a yoke 284 spanning the hub of the arm 278, and an arm 285. Both the yoke and the arm are slidably supported at their upper ends by the shaft 281. Pivoted to the hub of the arm 285 is an element 286 having a slot and pin connection 287 with a collar 288 journaled on the shaft 281 and pivoted to the upper arm of the element 286 is a pin 291 slidable in the upper end of the arm 285. A spring 292 surrounding the pin 291 and compressed between a stud in said pin and the upper end of arm 285 holds the element 286 in the position in which it is shown in Figs. 3 and 6, that is, with the pin of the slot and pin connection 287 seated in the upwardly inclined portion of the slot. Pivoted to a boss 293 on the machine base is a bell crank 294 having a slot and pin connection between its upper end and the collar 288. A pitman 295 reciprocated by the groove 296 in a cam attached to the sleeve 241 is pivoted to the lower end of the bell crank. The type carriers 175 each have a hole 297, these holes being in alinement with the pin 291 when the type carriers are at the zero 170ª positions and a series of depressions 298 corresponding to the other negative type are provided to receive the end of the pin 291 when the type carriers are out of the zero position. When the bell crank 294 is rocked by its pitman the collar 288 is slid to the left, Fig. 6, on the shaft 281, and through the slot and pin connection between the collar 288 and the element 286 moves the arm 285 and yoke 284 in the same direction until the end of the pin 291 is stopped by a type carrier which has been rotated past its zero position. Continued movement of the bell crank 294 causes the disabling of the slot and pin connection 287, and, because of the shape of the slot, rocking the element 286 about its pivot to engage its nose 301 with the proper notch of the alining plate 302, the sliding movement of the parts, of course, causing the splined arm 278 to be slid along the shaft 281, thereby withdrawing its pin 277 from engagement with the slots in the plate 275 carrying the type carriers with which the pin 291 has been engaged. A lining device 303 journaled on the shaft 7 and having a laterally extending arm 304 normally in engagement with the lower of two notches in the rear ends of the plates 275 is then operated by a pitman 306 actuated by the groove 307 in a cam attached to the sleeve 241 to withdraw the lining arm from engagement. The shaft 281 is then rocked clockwise, Fig. 5, by a cam 308, pitman 311 and arm 312 fast to said shaft, thereby swinging the plates 275 with which the pin 277 remains in engagement toward the rear of the machine. As the type carriers attached to these plates are in engagement with the segments 173 this movement of the plates causes the carriers to be rotated sufficiently to present their type of next lower value at the printing line. The lining device is then engaged with the upper notches in the rear ends of plates 275 while the impression is taken from the type and the pitmen 295 and 306 are then operated to restore the parts to normal. It is in this way that the complementary amount set up on the type when the totalizer is reset under the negative adjustment is corrected to offset the effects of the borrowing operations of the transfer mechanism and thereby show the true amounts by which the totals of the additions have been exceeded.

To illustrate the operation of this correcting mechanism, reference is again made to the example where the totalizer became negative by one cent and 111.11 was set up on the type carriers. At the proper point in the operation, the pin 291 is carried toward the type carriers until it is stopped and disconnected from the driving mechanism by the units type carrier. As the end of the pin 291 is then seated in one of the recesses 298 in the units type carrier said type carrier is held immovable. As the pin 291 moves into engagement with the units type carrier the pin 277 is withdrawn from the carrying plate 275 for that carrier and the plates 275 with which pin 277 remains in engagement are then adjusted by the movement of the pin 277, rotating the type carriers to show their digits of the next lower order, which in this instance are the zeros 170ᵇ. If, however, the amount on the totalizer is such that in setting up the complement on the type carriers the lower order type carriers are not adjusted past their zero 170ª positions, the pin 291 goes through the holes in said carriers and holds them and the next carrier which has been adjusted to show more than zero against rotation while the rest of the carriers are given the usual one step adjustment. For instance, if when the totalizer is reset it is negative by 010.00, the adding gears will stand at 990.00 and as a result 110.00 will be set up on the type carriers. The pin 291 will then be passed through the zero holes in the three right-hand type carriers and engage a recess 298 in the fourth type carrier holding all four carriers immovable while the fifth or highest amount carrier is advanced one step before the impression is taken, thereby causing to be printed 010.00, which is correct.

The type carrier 315, Fig. 3, for the special bank has a normal neutral position and is differentially rotated in operations of the machine in the same way as the amount type carriers. The arrangement of the special characters on the periphery of the carrier is shown diagrammatically in Fig. 7. When the credit key 13 is pressed and the machine operated to enter an item, the segment 23 of the special key bank swings down until stopped by the depressed key and the type carrier 315 is then positioned to present at the printing line the credit characters designated by the numeral 516. The debit characters designated by the numeral 517 are rendered effective in the same way by operations of the debit key 12. In totalizing operations the special key bank segment 23 is always stopped by the end of the depressed total key 11 regardless of whether the balance to be printed is positive or negative. If the balance is positive the credit characters designated 518 are adjusted to the printing line, but if the balance is negative the carrier is reversely rotated in the opposite direction and is then given the correcting step of movement at the same time that the movement is given to the higher order amount carriers, thereby presenting at the printing line debit characters designated by the numerals 519.

In item entering operations, as shown by Figs. 12 and 13, no character is printed to designate the position of the lever 14, although type to print such a character can be readily provided. However, when the lever 14 is adjusted to its upper or total taking position a type carrying arm 321, Figs. 3 and 5, is moved to position to print the T when the impression is taken. The arm 321 is secured to the shaft 170 which is journaled in the printer frames. Arm 322 fastened to this shaft is connected by a link 323 to an arm 324 fastened on the shaft 55 to which the lever 14 is secured. When the lever 14 is adjusted to the upper position the arm 321 is through the intermediate devices mentioned, swung to carry the type on its lower end forward to the printing line.

Any of a number of well known forms of paper feeding and impression taking devices can be used in connection with the type carrier adjusting mechanism of the invention; for this reason no detailed showing or description of any particular form is necessary and in Fig. 5 there is shown simply a conventional detail strip printer arranged so that the printed strip can be drawn out far enough for all of the printing to be clear of the machine and then torn off with the assistance of the blade 328. Some form of mechanism of this general type would probably be preferred in actual practice.

A brief résumé of the construction and operation of the machine will next be given: In balancing an account the debits and credits may be listed and totaled separately and the two totals then reëntered in the machine and the balance struck by another totaling operation or the debits and credits may be entered indiscriminately and then balanced as preferred. The totalizer comprises two sets of gears bearing a complemental relation to each other and having the gears of same denomination intermeshed in pairs so that rotation of one gear will cause opposite rotation of the other to the same extent. One set of gears, the credit, or, as they are usually called herein, the adding gears, is added upon when credits are entered and subtracted from by reverse rotation when debits or subtracting items are entered, depending upon whether this adding set or the companion set is directly coöperating with the actuators.

The actuators used are of the oscillatory type and all items are entered in the totalizer by engaging the totalizer with said actuators while they are moving in one direction and disengaging them during the opposite movement of the actuators. Adjustment of the lever 14 through the devices controlled thereby reverses the order of engagement and disengagement so that the actuators will reset the totalizer to zero. An amount type carrier is provided for each bank of value keys, each carrier having a positive set and a negative set of type, the sets bearing a complemental relation to each other. If, when the lever 14 is adjusted to the totaling position and the machine operated, the amounts added have exceeded the amounts subtracted the amount which remains on the totalizer after the various subtractions is set up on the type carriers. If, however, during the entry of items the total of the debits or subtractions runs over the amounts added on the adding gears, the transfer devices are tripped all the way across the totalizer, beginning with the lowest companion gear that passes from zero to one or more and the corresponding adding elements are reversely rotated one step by the transfers in addition to whatever reverse movement they may have been given through the actuation of the companion gears. This movement of the higher order totalizing elements causes the long tooth of the highest order adding gear to operate the controlling mechanism so that subsequent adjustment of the lever 14 will cause the broad tooth pinion 243 to clutch the negative type operating mechanism to the main driving mechanism. Then when the machine is operated to reset the totalizer the racks 162 are shifted to operate the type carriers in the opposite direction and set up on the negative type an amount depending upon the number of steps that the adding elements are rotated in resetting to zero. Owing to the operation of the borrowing mechanism, however, all the type carriers above but not including the first right-hand carrier showing more than zero are positioned to print a digit one higher than the correct figure. The correcting devices are then adjusted to the left until the pin 291 is stopped by the right-hand carrier just mentioned and all the carriers with which the pin 291 is engaged are held against any movement. The pin 277 which was moved laterally with the pin 291 and thereby withdrawn from all the plates 275 for the carriers with which the pin 291 became engaged is then moved to throw the plates with which it remains engaged toward the rear of the machine. This movement in connection with the fact that the type carriers are constantly in engagement with the operating segments causes the carriers mounted on the operating plates to be rotated one step so as to position their types of next lower value just before the impression is taken.

While the form of mechanism herein shown and described is admirably adapted to fulfil the objects primarily stated, it is to be understood that it is not intended to confine the invention to the one form of embodiment herein shown and described as it is susceptible of embodiment in various forms, all coming within the scope of the claims which follow.

What is claimed is:—

1. In a machine of the class described, the combination with a totalizer comprising adding and subtracting elements, of digit carriers, means for operating the digit carriers to set up thereon the amount on the adding elements when the additions have exceeded the subtractions or the complement of such amount when the subtractions have exceeded the additions, and means effective under the latter condition for operating the digit carriers to subtract from the complemental amount shown thereon whereby to show the amount by which the additions have been exceeded.

2. In a machine of the class described, the combination with a totalizer comprising adding and subtracting elements, of a series of digit carriers, means controlled by the totalizer for operating the digit carriers to set up on said carriers the amount on the adding elements when the additions have exceeded the subtractions or the amount on the subtracting elements when the subtractions have exceeded the additions, and means effective when the latter condition prevails for operating the digit carriers to subtract from the amount on said carriers to show the amount by which the additions have been exceeded.

3. In a machine of the class described, the combination with digit carriers, of a totalizer having two sets of elements bearing a complemental relation to each other and geared together in pairs to provide a relative movement between them, a set of oscillatory actuators, means for effecting engagement of either set of elements with the actuators during movement of the latter in one direction and disengagement therefrom during their movement in the opposite direction thereby adding upon one set of elements or subtracting therefrom depending upon which set is directly coöperating with the actuators, transfer devices for carrying and borrowing and operating on whichever set of elements is in engagement with the actuators, means for reversing the order of engagement and disengagement of one set of elements and the actuators for zero setting purposes, means effective on the zero setting operations and controlled by the highest order element of said set for setting upon the digit carriers the complement of the amount on the set, and means controlled by the lower order digit carriers for giving the higher order carriers a movement beyond the setting up movement to render their digits of next lower values effective.

4. In a machine of the class described, the combination with digit carriers, of a keyboard, a plurality of elements differentially adjustable under control of the key board and returned to a normal starting point during each operation, actuators movable with the differentially adjustable elements and to a certain extent relatively thereto to provide for both carrying and borrowing through movement of the actuators relative to the differentially adjustable elements, two sets of totalizer elements geared together in pairs to provide a relative movement between the elements of each pair and separately engageable with the actuators, transfer mechanism to provide for both carrying and borrowing through movement of the actuators relatively to the differentially adjustable elements, means for effecting engagement of either set of totalizer elements with the actuators during movement of the latter in one direction and disengagement therefrom during their movement in the opposite direction thereby adding upon one set of elements or subtracting therefrom depending upon which set is coöperating directly with the actuators, means for reversing the order of engagement and disengagement between one set of elements and the actuators for zero setting purposes, means effective on zero setting operations and controlled by the highest order element of said set for setting up on the digit carriers the amount on the other set of totalizer elements, and means for automatically, as an incident to the zero setting operation, giving one or more higher order digit carriers a movement beyond that imparted by the setting up means thereby showing their digits of next lower values, the carriers to receive such additional movement being determined by the positions of the lower order carriers.

5. In a machine of the class described, the combination with a series of type carriers, of a keyboard, a plurality of elements differentially adjustable under control of the keyboard, means for restoring said elements to normal, actuators movable with the differentially adjustable elements and to a certain extent relatively thereto to provide for both carrying and borrowing through movement of the actuators relative to the differentially adjustable elements, two sets of totalizer elements geared together in pairs to provide a relative movement and separately engageable with the actuators, transfer mechanism to provide for both carrying and borrowing through movement of the actuators relative to the differentially adjustable elements, means for effecting engagement of either set of totalizer elements with the actuators during movement of the latter in one direction and disengagement therefrom during their movement in the opposite direction thereby adding upon one set of elements or subtracting therefrom according to which set is coöperating directly with the actuators, means for reversing the order of engagement between one set of elements and the actuators for zero setting purposes, means effective on zero setting operations for setting upon the type carriers the amount on the other set of totalizer elements, and means for automatically as an incident to the zero setting operation giving one or more higher order type carriers a movement beyond that imparted by the setting up means, thereby positioning their type of next lower values.

6. In a machine of the class described, the combination with a series of type carriers, of a key board, a plurality of elements differentially adjustable under control of the key board and returned to a normal starting point on each operation, actuators movable with the differentially adjustable elements and to a certain extent relatively thereto to provide for both carrying and borrowing through movement of the actuators relative to the differentially adjustable elements, two sets of totalizer elements geared together in pairs to provide a relative movement between the elements of each pair and separately engageable with the actuators, transfer mechanism to provide for both carrying and borrowing through movement of the actuators relative to the differentially adjustable elements, means for effecting engagement of either set of totalizer elements with the actuators during movement of the latter in one direction and disengagement therefrom during their movement in the opposite direction thereby adding upon one set of elements or subtracting therefrom according to which set is coöperating directly with the actuators, means for reversing the order of engagement between one set of elements and the actuators for zero setting purposes, means effective on zero setting operations and controlled by the highest order element of said set for setting up on the type carriers the amount on the other set of totalizer elements and means for automatically as an incident to the zero setting operation giving one or more higher order type carriers a movement beyond that imparted by the setting up means thereby positioning their type of next lower values.

7. In a machine of the class described, the combination with a key board, of a differential mechanism controlled thereby, a totalizer comprising a plurality of denominational groups each consisting of a debit and a credit element selectively engageable with the differential mechanism, digit carriers, means for resetting the totalizer to zero, the differential mechanism being controlled by the totalizer in resetting operations to predetermine the extent of adjustment of the digit carriers, means for adjusting the digit carriers, means controlled by the highest order denominational group whereby the digit carrier adjusting means will set up on the carriers the amount on the credit elements when the credits exceed the debits or the amount on the debit elements when the debits are in excess, and means effective when the latter condition prevails and controlled by the digit carriers whereby the lowest order carriers, or in case the amount set up ends in ciphers, the lower order carriers showing consecutive ciphers and the carrier of next higher order is held against rotation and the remaining carriers each given a step of movement to show their digits of next lower value.

8. In a machine of the class described, the combination with a keyboard, of a differential mechanism controlled thereby, a totalizer comprising a plurality of denominational groups each consisting of a debit and a credit element selectively engageable with the differential mechanism, type carriers, means for resetting the totalizer to zero, the differential mechanism being controlled by the totalizer in resetting operations to predetermine the extent of adjustment of the type carriers, means for adjusting the type carriers, means controlled by the highest order denominational group whereby the type carrier adjusting means will set up on the carriers the amount on the credit elements when the credits exceed the debits or the amount on the debit elements when the debits are in excess, and means effective when the latter condition prevails and controlled by the type carriers whereby the lowest order carriers, or, in case the amount set up ends in ciphers, the lower order carriers showing consecutive ciphers and the carrier of next higher order is held immovable and the remaining carriers each given a step of movement to position their type of next lower values.

9. In a machine of the class described, the combination with a set of digit carriers, of a set of actuators, a totalizer comprising a plurality of pairs each consisting of an adding element and a subtracting element selectively engageable with the actuators during movement of said actuators in one direction and so arranged that forward movement of one by the actuators will cause backward rotation of the other, means for engaging the adding elements with the actuators during their movement in the opposite direction and thereby resetting both sets of elements to zero, means effective on resetting operations for transferring to the digit carriers the amount on the adding elements when the additions have exceeded the subtractions or the amount on the subtracting elements when the subtractions have exceeded the additions, and means effective when the latter condition prevails controlled by the positions of the digit carriers for holding certain carriers immovable and giving the others each a step of movement to show their digits of next lower values.

10. In a machine of the class described, the combination with a totalizer comprising denominational pairs of adding and subtracting elements having a complementary relative movement, an actuator for each pair, means for selectively engaging either the adding elements or the subtracting elements with the actuators during movement of the actuators in the opposite direction thereby resetting all totalizer elements to zero, type carriers having positive and negative type, means effective on resetting operations for operating the type carriers in one direction to set up on the positive type the amount on the adding elements when the balance is positive, means controlled by the totalizer for reversing the type carrier operating means to set up on the negative type the complement of such amount when the balance is negative, and means effective when the latter condition prevails controlled by the type carriers for holding certain type carriers immovable and moving the others to position their types of next lower value.

11. In a machine of the class described, the combination with a totalizer, of actuators therefor, the totalizer comprising different denominational groups each of which consists of an adding element arranged to be rotated in a forward direction when engaged with the actuators and a subtracting element arranged to backwardly rotate the adding element when the subtracting element is engaged with the actuators, manipulative means for predetermining which elements are to be engaged with the actuators, means for resetting the adding elements and thereby the subtracting elements to zero, type carriers, means effective on resetting operations for setting up on the type carriers the amount on the adding elements when the total of the additions exceeds the total of the subtractions or the complement of such amount when the total of the subtractions exceeds the total of the additions, and means for giving the type carriers an additional movement when the latter condition prevails to subtract from the amount shown on said carriers to show the true amount by which the total of the additions has been exceeded.

12. In a machine of the class described, the combination with totalizer actuators, of a totalizer comprising different denominational sets each consisting of a credit element arranged to be rotated in a forward direction when engaged with the actuators and a debit element arranged to backwardly rotate the credit element when the debit element is engaged with the actuators, manipulative means for predetermining which elements are to be engaged with the actuators, means for resetting the credit elements and thereby the debit elements to zero, type carriers, means effective on resetting operations for setting up on the type carriers the amount on the credit elements when the credits exceed the debits or the amount on the debit elements when the debits exceed the credits, and means effective when the debits exceed the credits and controlled by the type carriers for giving certain type carriers an independent step of movement to subtract from the amount shown thereon and thereby show the amount by which the debits exceed the credits.

13. In a machine of the class described, the combination with a totalizer comprising adding and subtracting elements, of digit carriers, means for resetting the totalizer to zero, means whereby resetting the totalizer to zero will operate the digit carriers to show the amount on the adding elements when the amounts added have exceeded the amounts subtracted or the complement of the amount on the adding elements when the amounts subtracted have exceeded the amounts added, and independent means for operating the digit carriers to subtract from the complemental numbers shown thereon whereby to show the amount by which the total of the additions has been exceeded.

14. In a machine of the class described, the combination with a totalizer comprising adding and subtracting elements, of digit carriers, independent members carrying the digit carriers, means for resetting the totalizer to zero, means whereby resetting the totalizer to zero will operate the digit carriers independently of said carrying members to show the amount on the adding elements when the amounts added have exceeded the amounts subtracted or the complement of such amount when the amounts subtracted have exceeded the amounts added, and means adapted to move certain of said carrying members for correcting said complements to show the amount by which the total of the additions has been exceeded.

15. In a machine of the class described, the combination with a totalizer comprising adding and subtracting elements, said elements bearing a complemental relation to each other, of digit carriers, means for resetting the totalizer to zero, means whereby resetting the totalizer to zero will operate the digit carriers to show the amount on the adding elements when the amounts added have exceeded the amounts subtracted or the amount on the subtracting elements when the amounts subtracted have exceeded the amounts added, and independent means effective under the latter condition for subtracting from the amount on the digit carriers to show the amount by which the total of the additions has been exceeded.

16. In a machine of the class described, the combination with a totalizer comprising adding and subtracting gears, of digit carriers having a positive set and a negative set of digits, means for resetting the totalizer gears to zero, means effective on resetting operations for operating the digit carriers to show by the positive digits the amount on the adding gears when the amounts added have exceeded the amounts subtracted or to show by the negative digits the complement of such amount when the amounts subtracted have exceeded the amounts added, and means effective when the amounts subtracted have exceeded the amounts added for giving certain ones of the digit carriers an additional movement to correct such complemental amount to show the true negative total.

17. In a machine of the class described, the combination with a totalizer comprising adding and subtracting elements bearing a complemental relation one to the other, of type carriers having a positive set and a negative set of type, means for operating the type carriers to set up on the positive type the amount on the adding elements when the amounts added have exceeded the amounts subtracted or to set up on the negative type the complement of the amount on the adding elements when the subtractions have exceeded the additions, and means effective when the latter condition prevails for giving certain type carriers an additional step of movement to correct the complemental amount set up on the negative type whereby to show the true negative balance.

18. In a machine of the class described, the combination with a totalizer arranged to receive debit and credit entries comprising two sets of elements geared together and bearing a complemental relation one to the other, of a set of actuators, means for engaging either set of elements with the actuators during their movement in one direction and disengaging them during movement in the opposite direction, means for reversing the order of engagement and disengagement between one set of elements and the actuators when it is desired to reset the totalizer to zero, type carriers, means effective on resetting operations for transferring amounts on the elements engaged with the actuators to the type carriers when the credits have exceeded the debits or the complements of such amounts when the debits have exceeded the credits, and means effective when the latter condition prevails for giving certain of the type carriers an additional movement to decrease the complemental number and thereby show the amounts by which the credits have been exceeded.

19. In a machine of the class described, the combination with a set of actuators, of an adding and subtracting totalizer comprising a set of elements rotated in one direction by operation of the actuators in adding operations and in the opposite direction in subtracting operations, means for resetting said elements to zero, type carriers, means effective on resetting operations for setting up on the type carriers the amount on said elements when the amounts added have exceeded the amounts subtracted or the complements of such amounts when the amounts subtracted have exceeded the amounts added, and means effective when the latter condition prevails for operating certain type carriers to position their type of next lower value whereby to show the true amount by which the total of the additions has been exceeded.

20. In a machine of the class described, the combination with an adding and subtracting totalizer comprising adding elements rotated in one direction in adding operations and in the opposite direction in subtracting operations, means for resetting said elements to zero, type carriers, means effective on resetting operations for setting up on the type carriers the amount on the adding elements when the total of the additions has exceeded the total of the subtractions or the complements of such amount when the total of the subtractions has exceeded the amounts added, and independent means effective when the latter condition prevails for operating the type carriers to subtract from the complementary amount thereon to show the true amount by which the total of the additions has been exceeded.

21. In a machine of the class described, the combination with a totalizer comprising adding and subtracting elements, of digit carriers having a positive set and a negative set of digits, means for resetting the totalizer to zero, and means controlled by the totalizer in resetting operations for setting the digit carriers to show by the positive digits the amount by which the subtrahend has been exceeded or by the negative digits the amount by which the minuend has been exceeded.

22. In a machine of the class described, the combination with a totalizer arranged to receive debit and credit entries, of a set of type carriers having two sets of complementarily arranged type, means for resetting the totalizer to zero, means for operating the type carriers in one direction in resetting operations to set up the balance on one set of type when the balance is positive and means controlled by the totalizer for reversing said type carrier operating means to set up the balance on the second set of type when the balance is negative.

23. In a machine of the class described, the combination with a totalizer arranged to receive debit and credit entries, of a set of type carriers having two sets of complementarily arranged type, means for resetting the totalizer to zero, means for operating the type carriers in one direction in resetting operations to set up the balance on one set of type when the balance is positive, means controlled by the totalizer for reversing said type carrier operating means to set up the balance on the second set of type when the balance is negative, and means effective when the latter condition prevails and controlled by the lower order type carriers for giving higher order carriers each a step of movement beyond the setting up movement to position their type of next lower value.

24. In a machine of the class described, the combination with a series of movable elements bearing lining teeth, of a series of lining arms to coöperate with said teeth, an element having an invariable oscillatory movement, an arm rigid with the lining arms and having a slot with which the invariably moved element is at all times in engagement, said slot being shorter than the path of movement of the invariably moved element and shaped to cause the invariably moved element to engage the lining arms with the movable elements and hold them in engagement during part of the invariable oscillatory movement.

25. In a machine of the class described, the combination with a plurality of digit carriers, of means for differentially rotating same, and independent devices controlled by the digit carriers for holding certain of said carriers immovable and operating the others to position their digits of next lower value.

26. In a machine of the class described, the combination with a set of numeral elements, and type carriers having connections to print totals from said elements, of independent levers carrying said type carriers, means for automatically moving said levers to adjust said type carriers the same distance relative to said elements whereby to print correct negative totals from incorrectly set numeral elements.

27. In a machine of the class described, the combination with a totalizer adapted for subtraction and addition, of digit carriers adapted to be moved in either direction, and means for operating the digit carriers in one direction when the additions have exceeded the subtractions and in the opposite direction when the subtractions have exceeded the additions to set up on the digit carriers the negative or positive total.

28. In a machine of the class described, the combination with a totalizer adapted for subtraction and addition, of digit carriers adapted to be moved in either direction, means for operating the digit carriers in one direction when the additions have exceeded the subtractions and in the opposite direction when the subtractions have exceeded the additions to set up on the digit carriers the positive or negative total, and means automatically controlled by the totalizer for determining the direction of movement of the digit carriers.

29. In a machine of the class described, the combination with a totalizer adapted for subtraction and addition, of digit carriers adapted to be moved in either direction, means for operating the digit carriers in one direction when the additions have exceeded the subtractions to set up on the digit carriers the positive total and for operating the digit carriers in the opposite direction when the subtractions have exceeded the additions to set up on the digit carriers an incorrect negative total, and means effective under the latter condition for operating the digit carriers to show the correct negative total.

30. In a machine of the class described, the combination with a totalizer adapted for subtraction and addition, of digit carriers adapted to be moved in either direction, means for operating the digit carriers in one direction when the additions have exceeded the subtractions to set up on the digit carriers the positive total and for operating the digit carriers in the opposite direction when the subtractions have exceeded the additions to set up on the digit carriers an incorrect negative total, means effective under the latter condition for operating the digit carriers to show the correct negative total, and means automatically controlled by the totalizer for determining the direction of movement of the digit carriers.

31. In a machine of the class described, the combination with a totalizer adapted for subtraction and addition, of digit carriers adapted to be moved in either direction, means for operating the digit carriers in one direction when the additions have exceeded the subtractions to set up on the digit carriers the positive total and for operating the digit carriers in the opposite direction when the subtractions have exceeded the additions to set up on the digit carriers an incorrect negative balance, and means automatically controlled by the totalizer under the latter condition for operating the digit carriers to show the correct negative balance.

32. In a machine of the class described, the combination with a totalizer comprising adding and subtracting elements, of actuating means therefor, manipulative means controlling the engagement of the adding and subtracting elements with the actuating means to effect addition and subtraction respectively, digit carriers adapted to be moved in one direction to print a negative total and in the opposite direction to print a positive total, and means controlled by the totalizer and independently of said manipulative means for determining the direction of movement of the type carriers when a total is to be printed.

33. In a machine of the class described, the combination with a totalizer comprising adding and subtracting elements, of actuating means therefor, manipulative means controlling the engagement of the adding and subtracting elements with the actuating means to effect addition and subtraction respectively, printing means adapted to print a negative or positive total, and means controlled by the totalizer and always independently of said manipulative means for determining whether the printing means will print a negative or a positive total.

34. In a machine of the class described, the combination with a totalizer comprising adding and subtracting elements, of actuating mechanism therefor, means for engaging the actuating mechanism and adding elements when an amount is to be added or when a positive or negative total is to be taken, and for engaging the subtracting elements when an amount is to be subtracted, and means for printing the positive and negative totals.

35. In a machine of the class described, the combination with a totalizer comprising adding and subtracting elements, actuating mechanism therefor, means for engaging the actuating mechanism and adding elements when an amount is to be added or when a positive or negative total is to be taken and for engaging the subtracting elements when an amount is to be subtracted, means for printing the positive and negative totals, and means controlled by the totalizer for correcting the negative total on the printing means when a negative total is to be printed.

36. In a machine of the class described, the combination with a totalizer constructed to operate back and forth through and at either side of zero, of operating mechanism therefor so constructed as to set all of the higher order denominational elements incorrectly to represent the result of operations when the totalizer passes in one direction from zero, and means controlled by the totalizer for reversely turning the higher order elements the same distance for printing the correct result of operations when the totalizer is incorrectly set.

37. In a machine of the class described, the combination with a totalizer constructed to operate back and forth through and at either side of zero, of operating mechanism therefor so constructed as to set all of the higher order denominational elements incorrectly to represent the result of operations when the totalizer passes to the negative side of zero, and means for reversely turning the higher order elements the same distance for printing correct negative totals from the incorrectly set totalizer.

38. In a machine of the class described, the combination with a totalizer constructed to pass back and forth through and operate at either side of zero, of totalizer operating mechanism so constructed as to set the higher order elements of the totalizer incorrectly to represent the result of operations when the totalizer passes in a negative direction from zero, and means controlled by the totalizer for reversely turning the higher order elements the same distance for printing correct positive and negative totals.

39. In a machine of the class described, the combination with a totalizer constructed to operate back and forth through and at either side of zero, of operating mechanism therefor comprising devices for effecting either carrying or borrowing, said devices operating when the totalizer passes through zero in the negative direction to effect an incorrect setting of the higher order elements of the totalizer, and means controlled by the totalizer elements for printing correct negative totals.

40. In a machine of the class described, the combination with a totalizer constructed to pass back and forth through and operate at either side of zero, of totalizer operating mechanism so constructed as to set the higher order elements of the totalizer incorrectly to represent the result of operations as the totalizer passes in a negative direction from zero, type carriers, means for adjusting the type carriers according to the setting of the totalizer, and means effective when the totalizer is in a negative condition for subtracting from the amount on the type carriers before printing.

41. In a machine of the class described, the combination with a totalizer constructed to operate back and forth through and at either side of zero, of type carriers, means controlled by the totalizer for adjusting the type carriers to print either positive or negative amounts, and means controlled by the type carriers when the amount is negative for positively holding lower order carriers stationary and positively adjusting the higher order carriers to position their type of next lower nature.

42. In a machine of the class described, the combination with a totalizer constructed to operate back and forth through and at either side of zero, of a set of type carriers, means controlled by the totalizer for adjusting the type carriers to print either positive or negative amounts, and means controlled by the type carriers when the amount is negative for holding lower order carriers stationary and adjusting higher order carriers to position their type of next lower value.

43. In a machine of the class described, the combination with a totalizer constructed to operate back and forth through and at either side of zero, of operating mechanism therefor comprising devices for effecting either carrying or borrowing, said devices operating when the totalizer passes in one direction through zero to effect an incorrect setting of the higher order elements of the totalizer, type carriers, means for adjusting the type carriers to show either a positive or negative amount depending upon the condition of the totalizer, and means effective when the totalizer elements are incorrectly set for imparting a single step of subtractive movement to each of the higher order type carriers.

44. In a machine of the class described, the combination with a totalizer constructed to operate back and forth through and at either side of zero, of operating mechanism therefor comprising devices for effecting either carrying or borrowing, said devices operating when the totalizer passes through zero in a negative direction to effect an incorrect setting of the higher order elements of the totalizer, type carriers, means controlled by the totalizer for adjusting the type carriers to show either positive or negative amounts depending upon the condition of the totalizer, and means effective when the totalizer is in a negative condition for positively imparting a subtractive correcting step of movement to each of the higher order type carriers.

45. In a machine of the class described, the combination with a totalizer constructed to operate back and forth through and at either side of zero, of operating mechanism therefor comprising devices for operating the totalizer to effect either carrying or borrowing, said devices operating when the totalizer passes through zero in a negative direction to effect an incorrect setting of the higher order elements of the totalizer, type carriers, means for adjusting the type carriers to show either a positive or a negative amount depending upon the condition of the totalizer, and means effective when the totalizer elements are incorrectly set for holding the lowest order type carrier stationary and simultaneously imparting a single step of subtractive movement to each of the higher order type carriers.

46. In a machine of the class described, the combination with a totalizer, of a set of type carriers, movable supports for the type carriers, connections for adjusting the type carriers relative to their supports to extents determined by the totalizer, and means for moving said supports to alter the amounts set upon the type carriers.

47. In a machine of the class described, the combination with a totalizer constructed to operate back and forth through and at either the positive or the negative side of zero, of a set of type carriers, connections for adjusting the type carriers relative to their supports, to extents determined by the totalizer, and means controlled by the totalizer when the totalizer is in a negative condition for moving said supports to alter the amount set up on the type carriers.

In testimony whereof I affix my signature in the presence of two witnesses.

HAAKON A. MARTIN.

Witnesses:
F. E. HAMILTON,
J. B. RICKETTS.